US006802489B2

(12) United States Patent
Marr et al.

(10) Patent No.: US 6,802,489 B2
(45) Date of Patent: Oct. 12, 2004

(54) MICRO-FLUIDIC VALVE WITH A COLLOIDAL PARTICLE ELEMENT

(75) Inventors: David W. M. Marr, Golden, CO (US); Tieying Gong, Golden, CO (US); John Oakey, Golden, CO (US); Alexander V. Terray, Golden, CO (US)

(73) Assignee: Colorado School of Mines, Golden, CO (US)

(*) Notice: Subject to any disclaimer, the term of this patent is extended or adjusted under 35 U.S.C. 154(b) by 0 days.

(21) Appl. No.: 10/138,799

(22) Filed: May 3, 2002

(65) Prior Publication Data

US 2003/0012657 A1 Jan. 16, 2003

Related U.S. Application Data

(60) Provisional application No. 60/288,346, filed on May 3, 2001, and provisional application No. 60/289,504, filed on May 8, 2001.

(51) Int. Cl.[7] .............................................. F16K 31/02
(52) U.S. Cl. .............................. 251/129.14; 251/129.01
(58) Field of Search ....................... 251/129.01, 129.14, 251/65, 129.06; 137/625.48, 625.18

(56) References Cited

U.S. PATENT DOCUMENTS

| | | | | |
|---|---|---|---|---|
| 3,341,274 A | * | 9/1967 | Marks ........................ 359/296 |
| 3,556,156 A | * | 1/1971 | Fuller, Jr. ..................... 138/43 |
| 4,267,509 A | * | 5/1981 | Graham ................... 324/244.1 |
| 4,556,195 A | * | 12/1985 | Calkins ..................... 251/129.2 |
| 5,026,681 A | * | 6/1991 | Hed ............................ 505/165 |
| 5,427,663 A | | 6/1995 | Austin et al. ............ 204/180.1 |
| 5,681,484 A | * | 10/1997 | Zanzucchi et al. ............. 216/2 |
| 5,837,115 A | | 11/1998 | Austin et al. ................ 204/450 |
| 5,953,166 A | * | 9/1999 | Shikano ....................... 359/837 |
| 5,992,820 A | * | 11/1999 | Fare et al. ............. 251/129.01 |
| 6,007,690 A | | 12/1999 | Nelson et al. .............. 204/601 |
| 6,095,189 A | * | 8/2000 | Ben-Shalom ................ 137/606 |
| 6,097,530 A | * | 8/2000 | Asher et al. ................. 359/288 |
| 6,114,405 A | * | 9/2000 | Zhuang et al. ................. 522/99 |
| 6,251,691 B1 | | 6/2001 | Seul ............................ 436/534 |
| 6,261,430 B1 | | 7/2001 | Yager et al. ................. 204/455 |
| 6,355,491 B1 | | 3/2002 | Zhou et al. .................. 436/518 |
| 6,368,871 B1 | | 4/2002 | Christel et al. ............. 436/180 |
| 6,387,707 B1 | | 5/2002 | Seul et al. ................... 436/164 |

FOREIGN PATENT DOCUMENTS

WO    WO 00/17624    * 3/2000    .......... G01N/15/14

OTHER PUBLICATIONS

Hayward et al. "Electrophoretic assembly of colloidal crystals with optically turnable micropatterns"; Nature, vol. 404, Mar. 2, 2000, Macmillan Magazine Ltd.*
A. Manz, C.S. Effenhauser, N. Burggraf, D.J. Harrison, K. Seiler and K. Fluri, "Electroosmotic Pumping and Electrophoretic Separations for Miniaturized Chemical Analysis Systems", *J. Micromech. Microeng.*, 1994, pp. 257–265, 4, IOP Publishing Ltd., United Kingdom.

(List continued on next page.)

*Primary Examiner*—Justine R. Yu
*Assistant Examiner*—Timothy P. Solak
(74) *Attorney, Agent, or Firm*—Holland & Hart LLP; Christopher J. Kulish, Esq.

(57) ABSTRACT

The present invention relates to the use colloidal particles to realize photonic and microfluidic devices. In particular embodiments, colloidal particles are used to realize microfluidic a two-way valve, three-way valve, check valve, three-dimensional valve, peristalsis pump, rotary pump, vane pump, and two-lobe gear pump. In certain embodiments, actuation of an active element in the microfluidic structure is accomplished by electrophoresis, the use of an optical trap or "tweezer", or the application of an electric field or magnetic field. In other embodiments, the application of an electrical field to colloidal particles that are substantially constrained to two dimensional movement is used to realize wave guides, filters and switches for optical signals.

18 Claims, 21 Drawing Sheets

OTHER PUBLICATIONS

M.A. Unger, H. Chou, T. Thorsen, A. Scherer, and S.R. Quake, "Monolithic Microfabricated Valves and Pumps by Multilayer Soft Lithography", *Science*, Apr. 7, 2000, pp. 113–116, 288, American Association for the Advancement of Science, USA.

D.J. Beebe, J.S. Moore, J.M. Bauer, Q..Yu, R.H. Liu, C. Devadoss and B. Jo, "Functional Hydrogel Structures for Autonomous Flow Control Inside Microfluidic Channels", *Nature*, Apr. 6, 2000, pp. 588–590, 404, Macmillan Magazines Ltd., USA.

Q. Yu, J.M. Bauer, J.S. Moore and D.J. Beebe, "Responsive Biomimetic Hydrogel Valve for Microfluidics", *Applied Physics Letters.*, Apr. 23, 2001, pp. 2589–2591, 78–#17, American Institute of Physics, USA.

S. Kawata, H. Sun, T. Tanaka and K. Takada, "Finer Features for Functional Microdevices", *Nature*, Aug. 16, 2001, pp. 697–698, 412, Macmillan Magazines Ltd., USA.

K. Zahn and G. Maret, "Two–dimensional Colloidal Structures Responsive to External Fields", *Current Opinion in Colloid & Interface Science*, 1999, pp. 60–65, 4, Elsevier Science Ltd., United Kingdom.

M. Böhmer, "In Situ Observation of 2–Dimensional Clustering During Electrophoretic Deposition", *Langmuir*, Nov. 27, 1996, pp. 5747–5750, 12–#24, American Chemical Society, USA.

J.D. Debord, S.Eustis, S.B. Bebord, M.T. Lofye and L.A. Lyon, "Color–Tunable Colloidal Crystals from Soft Hydrogel Nanoparticles", *Advanced Materials*, May 3, 2002, pp. 658–662, 14–#9, Wiley–VCH Verlag GmbH, Germany.

R.C. Hayward, D.A. Saville and I.A. Aksay, "Electrophoretic Assembly of Colloidal Crystals with Optically Tunable Micropatterns", *Nature*, Mar. 2, 2000, pp. 56–59, 404, Macmillan Magazines Ltd., USA.

R.E. Kusner, J.A. Mann, J. Kerins and A.J. Dahm, "Two–Stage Melting of a Two–Dimensional Colloidal Lattice with Dipole Interactions", *Physical Review Letters*, Dec. 5, 1994, pp. 3113–3116, 73–#23, The American Physical Society, USA.

R.E. Kusner, J.A. Mann and A.J. Dahm, "Two–Stage Melting in Two Dimensions in a System with Dipole Interactions", *Physical Review B*, Mar. 1, 1995, pp. 5746–5759, 51–#9, The American Physical Society, USA.

G. Pan, R. Kesavamoorthy and S.A. Asher, "Optically Nonlinear Bragg Diffracting Nanosecond Optical Switches", *Physical Review Letters*, May 19, 1997, pp. 3860–3863, 78–#20, The American Physical Society, USA.

A. Richel, N.P. Johnson and D.W. McComb, "Observation of a Bragg Reflection in Photonic Crystals Synthesized from Air Spheres in a Titania Matrix", *Applied Physics Letters*, Apr. 3, 2000, pp. 1816–1818, 76–#14, American Institute of Physics, USA.

A.T. Skjeltorp, "One– and Two–Dimensional Crystallization of Magnetic Holes", *Physical Review Letters*, Dec. 19, 1983, pp. 2306–2309, 51–#25, The American Physical Society, USA.

M. Trau, D.A. Saville and I.A. Aksay, "Field–Induced Layering of Colloidal Crystals", *Science*, May 3, 1996, pp. 706–709, 272, American Association for the Advancement of Science, USA.

* cited by examiner

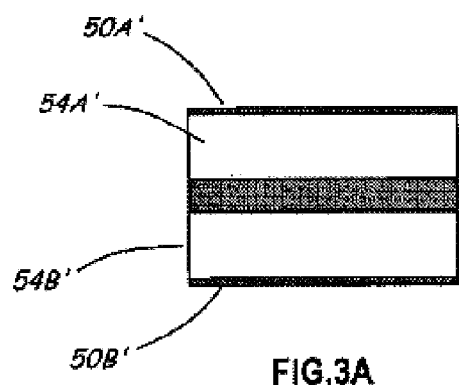
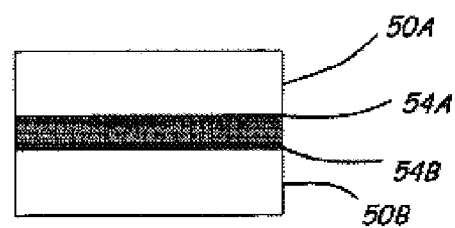
FIG. 3A    FIG. 3B
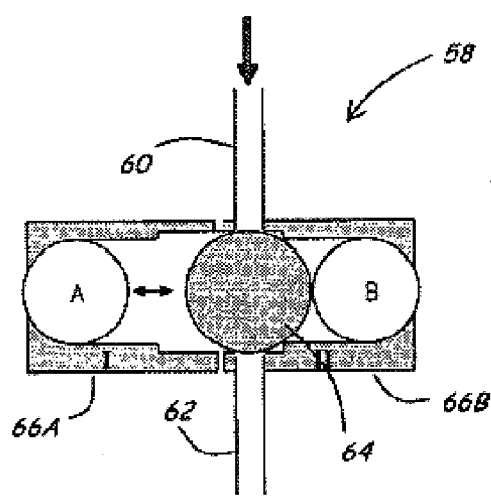
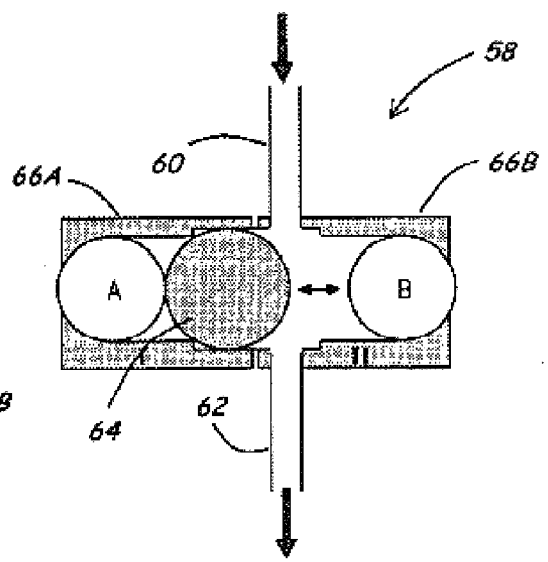
FIG. 4A    FIG. 4B

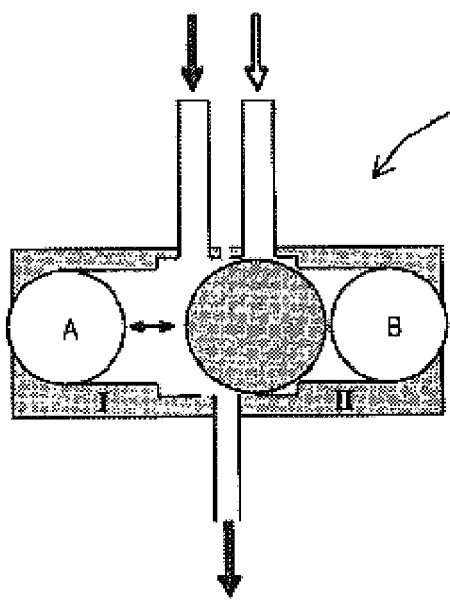 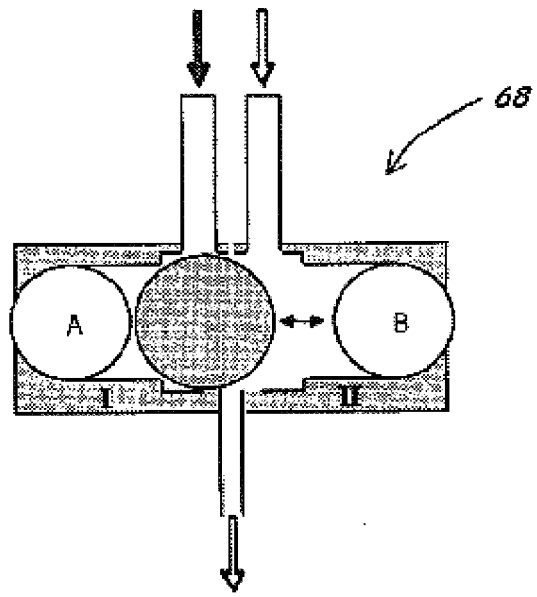
FIG. 5A                FIG. 5B
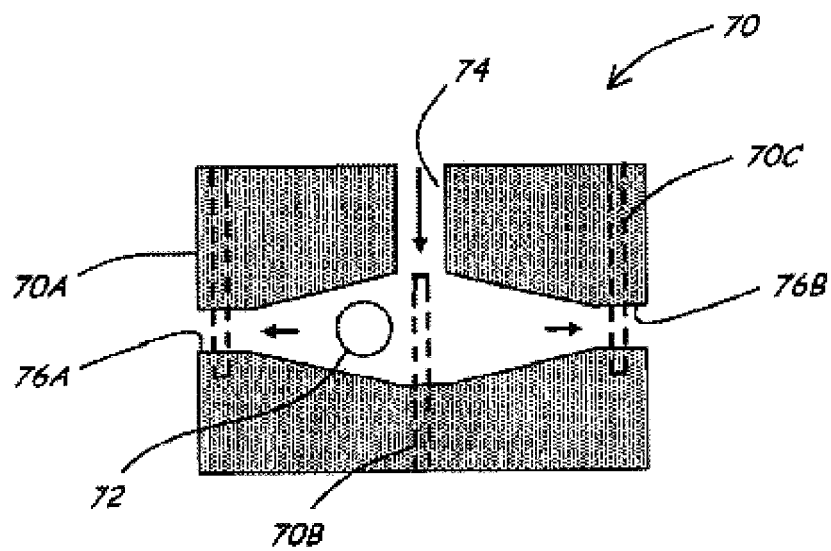
FIG. 6

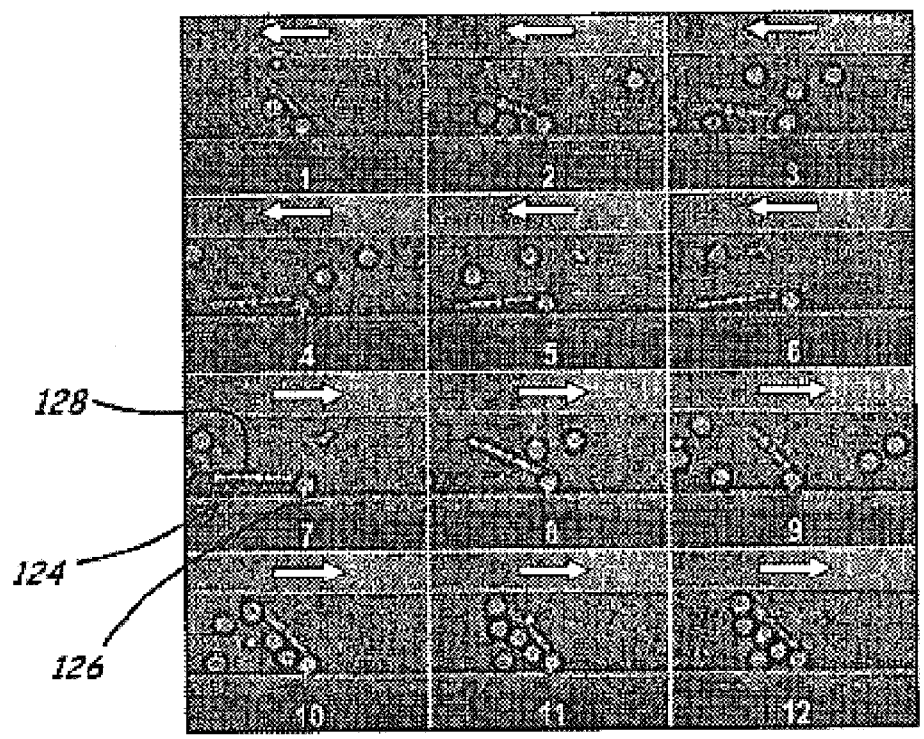
FIG.18(1-12)
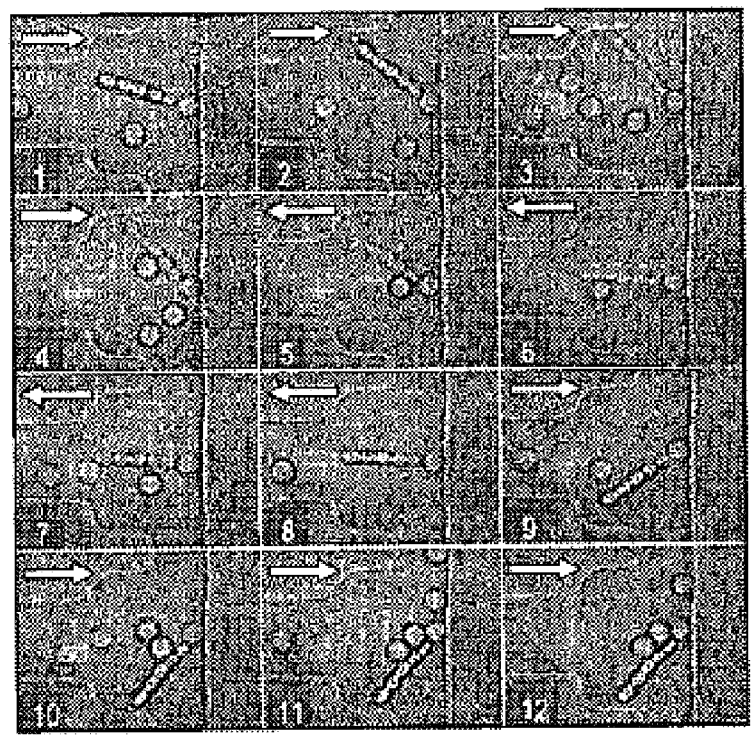
FIG.19(1-12)

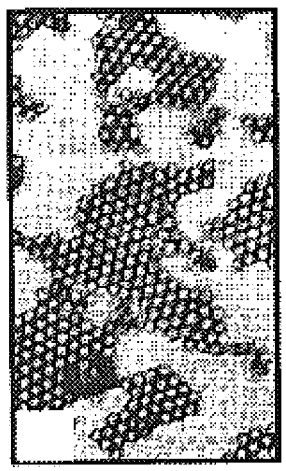 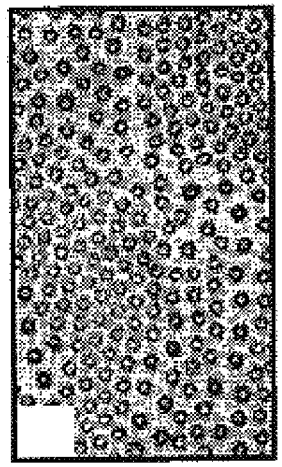 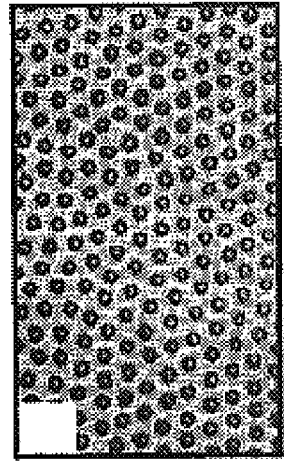
FIG.20A        FIG.20B        FIG.20C
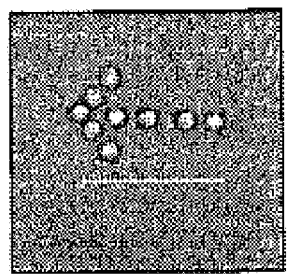 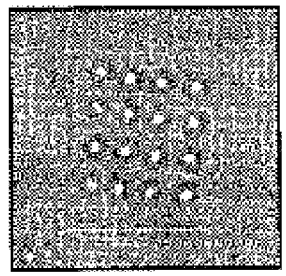
FIG.21A        FIG.21B
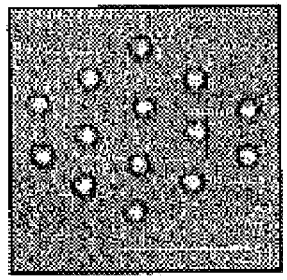 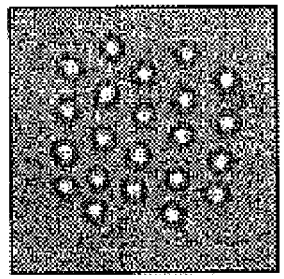
FIG.21C        FIG.21D

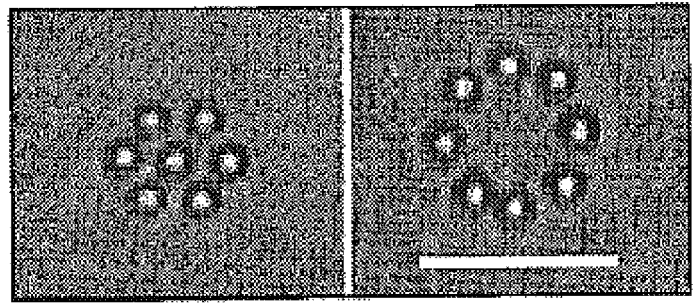
FIG.22A
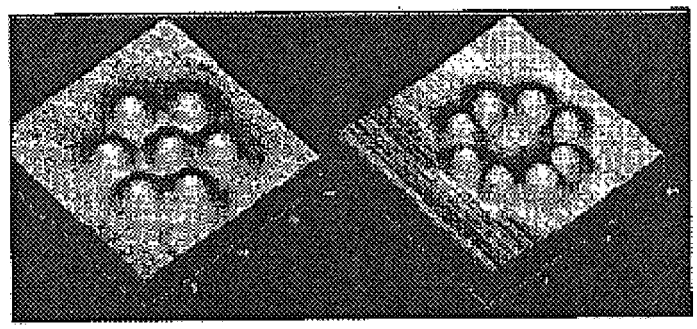
FIG.22B
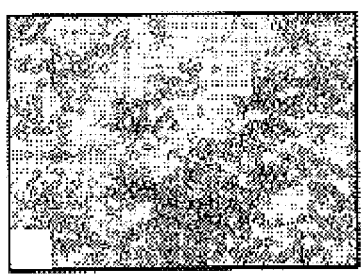   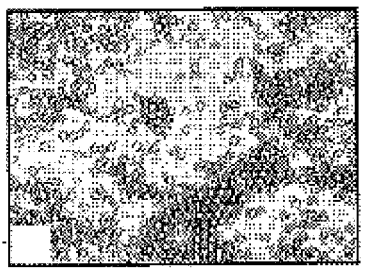   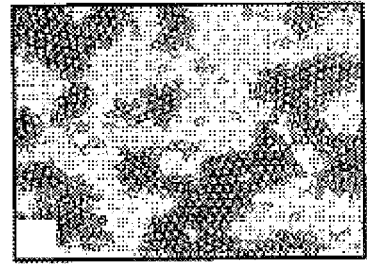
FIG.23A        FIG.23B        FIG.23C

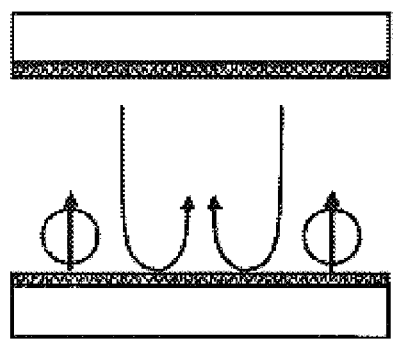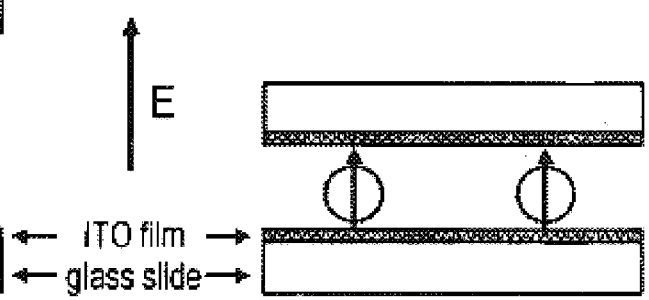
FIG.24A  FIG.24B
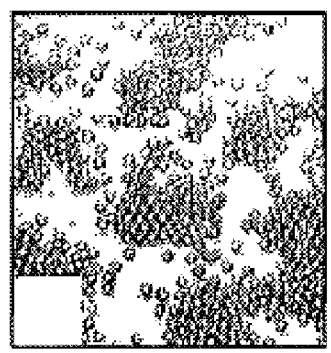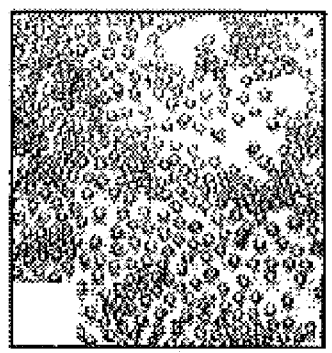
FIG.25A  FIG.25B
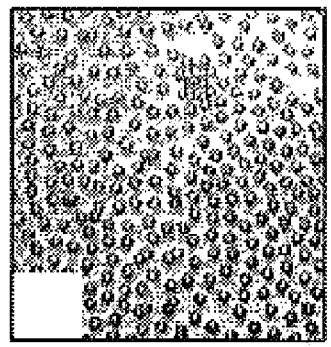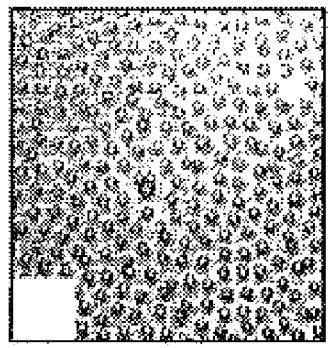
FIG.25C  FIG.25D

 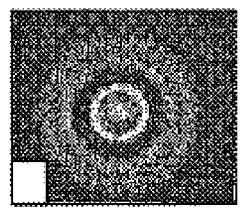 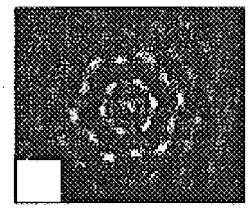
FIG.30A  FIG.30B  FIG.30C
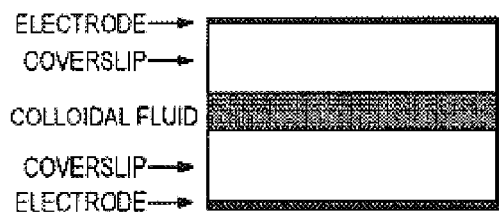 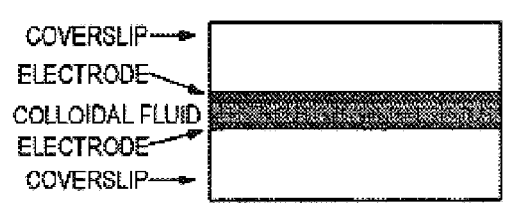
FIG.31A  FIG.31B
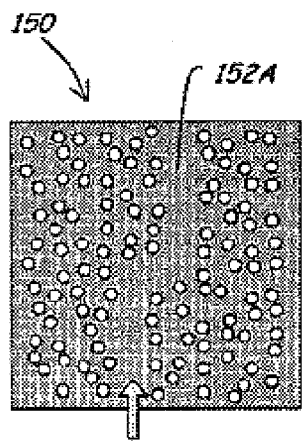 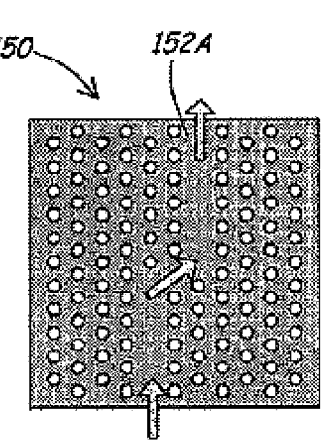 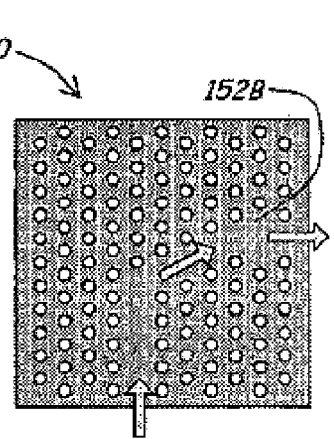
FIG.32A  FIG.32B  FIG.32C

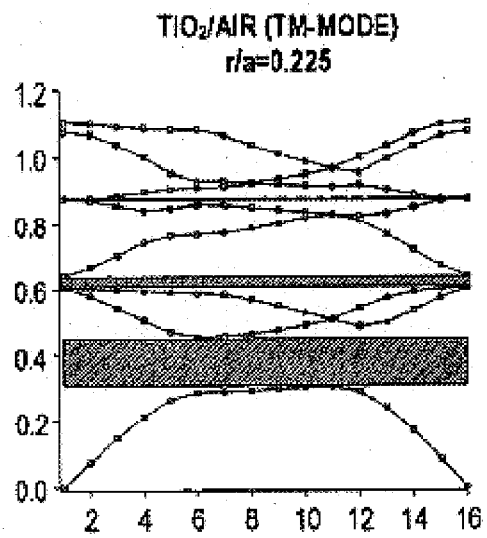
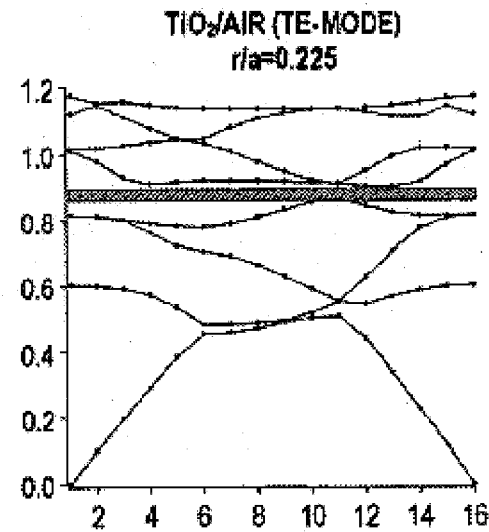
FIG.35A  FIG.35B
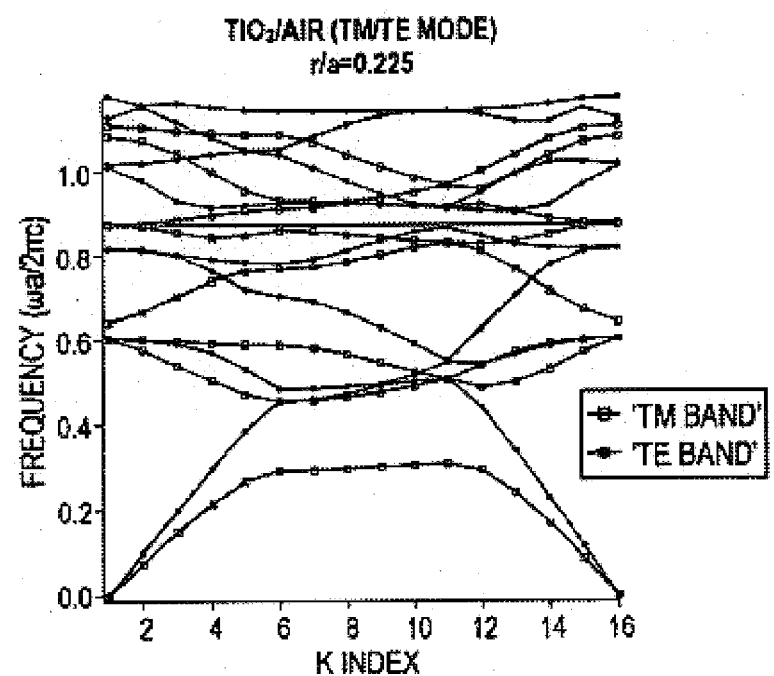
FIG.36

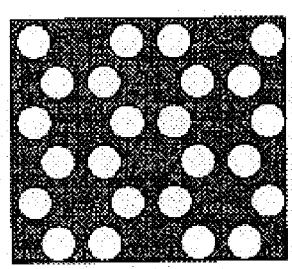 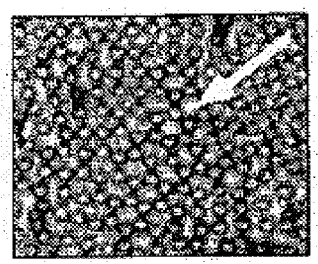 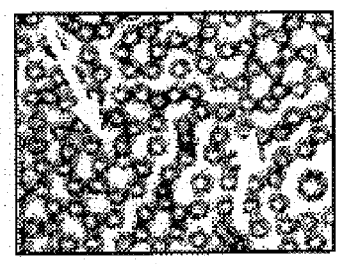
FIG.37A          FIG.37B          FIG.37C
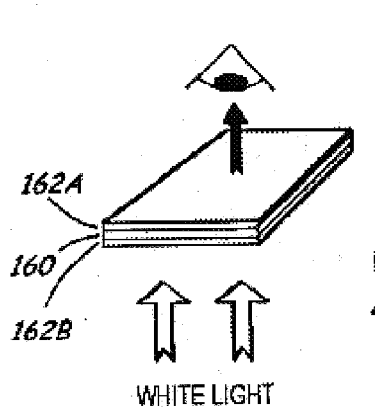 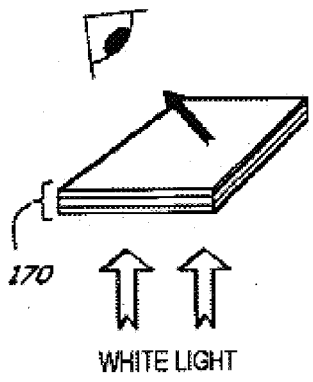 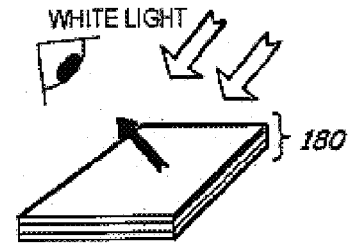
FIG.38A          FIG.38B          FIG.38C

MICRO-FLUIDIC VALVE WITH A COLLOIDAL PARTICLE ELEMENT

CROSS-REFERENCE TO RELATED APPLICATIONS

The present application is a continuation of provisional patent application Ser. No. 60/288,346, filed on May 3, 2001, and provisional patent application Ser. No. 60/289,504 filed on May 8, 2001, both of which are incorporated herein, in their entireties, by reference.

FIELD OF THE INVENTION

The present invention is directed to the use of colloidal-size particles to realize microfluidic and photonic devices.

BACKGROUND OF THE INVENTION

The "lab-on-a-chip" concept, in which three-dimensional microfabrication techniques borrowed from the integrated circuit industry are employed to create electrical circuits that interface with chemical or biological systems upon micro-patterned substrates, has gained significant research interest in recent years, and has been heralded as the next silicon revolution. The drastic reduction in length scales from conventional techniques to microelectrical-mechanical systems (MEMS) will allow tasks to be performed more rapidly, efficiently, and on smaller sample volumes than ever before. Functional systems fabricated to exploit this microscale fluid motility possess great promise to significantly streamline processes for fundamental research and medical applications in areas such as bioanalysis, medical diagnostics and therapeutics. Such developments will enable a large-scale shift from centralized laboratories to remote point-of-care and benchtop diagnostic facilities.

Initially, single devices such as pumps, valves, mixers, filters, and sensors have been developed to perform individual tasks on microfluidic samples. Seamlessly integrating individual devices capable of single operations will finally bring to fruition the promise of micro total analysis systems ($\mu$TAS) as portable laboratories, chemical production facilities, remediation units, health monitors and countless other applications which would benefit from miniaturization. In order to construct such devices, however, a common platform must be developed which allows for complete control of heterogeneous or complex fluids as well as specifically targeted sensing and feedback actuation.

Generally, the utility, speed and performance of microfluidic chips increases as the overall device size decreases, particularly for devices that are ultimately designed for human implantation. The need to mix, administer and separate fluids at these length scales has long been a limiting factor in such devices. Specifically, the ultimate size of microfluidic devices has been restricted by the size of the actuator, which can be classified as either those micromachined specifically for microfluidic application or conventional actuators that have been miniaturized for integration with microfluidic devices. Examples of the latter include electromagnetic plungers connected to pneumatic systems, miniature piezoelectrics and memory alloys. Such actuators function well, but must be affixed to the microfluidic chip as additional hardware with epoxy resin. Actuators that may be micromachined, such as electrostatic, thermopneumatic, electromagnetic and bimetallic actuators consume significantly less space than conventional actuators but often require difficult etching procedures.

Microfluidic flow controllers, such as chip-top valves and pumps, have also historically been plagued by size limitations imposed by actuators. The first microvalve consisted of a silicon seat with a nickel diaphragm actuated by a solenoid plunger and measured approximately 3 mm. Subsequently, as piezoelectric stacks, electromagnetic alloys and thermopneumatics became fashionable, microvalves and reciprocating micropumps became smaller, but continue to dwarf the scale of microchannels and other chip-top features. More recently, electroosmosis, which requires no moving parts and overcomes some of these limitations, has experienced success as a viable means of microfluidic flow generation and control. This technique is quite efficient at transporting and separating ionic liquids and relies upon the principle of electrophoresis, the migration of ions in an electric field, and the resulting osmotic pressure gradient to induce the flow of bulk fluids.

While some current microfluid handling devices and techniques enable functional devices at microscales, they may also impose significant constraints upon potential device capability, flexibility and performance. For instance, electroosmotically driven flow requires complex circuitry, a high-voltage power supply and is dependent upon the ionic properties of the solution and has the potential to separate components of the solution from the bulk. While molecular separation by electrophoresis has been exploited for particular applications such as nucleic acid sequencing and the development of protein targeted chemotherapy, the complications discussed here are generally considered obstacles to $\mu$TAS intended for applications with heterogeneous fluids such as blood or urine. Additionally, the scale of flow controllers, such as pumps and valves, has not kept pace with the miniaturization of flow channels themselves, thus limiting the ultimate size at which practical devices may be created. Recent efforts have made strides to overcome the limitations of traditional materials and techniques; for example, a first-generation pumping and valving system fabricated completely from elastomeric materials allows for in situ fluids control on length scales below 100 $\mu$m. While functionally simple and conceptually elegant, the pneumatic actuation scheme still hinders the ultimate utility of these devices through the need for interfacing to external equipment. To completely integrate fluidic processes upon a single chip, the current paradigms of microfluids handling must be abandoned in favor of units that are of equivalent size to the process into which they are being imbedded. An attempt to achieve these ends has been made using "smart" hydrogel structures fabricated directly within microfluidic networks ($\mu$FNs). These structures, while only tens of microns in size and very efficient at measuring and responding to specific environmental conditions, such as pH and temperature, are quite limited in their sensing capabilities and ability to produce a broad range of feedback options. Additionally, these structures have demonstrated only the ability to regulate flow, not initiate it. Integrating simultaneous microscale fluid pumping and valving completely on the microscale is a key component to the development of $\mu$TAS.

Microscale devices designed to accomplish specific tasks have repeatedly demonstrated superiority over their macroscale analogues and in many cases have proven capable of performing functions not possible on the macroscale. The advantages of such devices are due largely to unique transport properties resulting from low Reynolds number flows (Re<1) and vastly increased surface to volume ratios. Additionally, microfluidic processes may be easily parallelized for high throughput and require vastly smaller sample volumes; a significant benefit for applications in which reagents or analytes are either hazardous or at a premium. In general, the utility, speed and performance of Microsystems increase as the overall device size decreases. The need to mix, pump, and direct fluids at very small length scales, however, has long been the limiting factor in the development of microscale systems, thus generating a tremendous amount of interest in the burgeoning field of microfluidics. As improved actuation techniques have become available, conventional valving and pumping schemes have been miniaturized yet continue to dwarf microchannels and other chip-top features. Recently, several approaches conceived explicitly for the microscale have been developed including platforms based upon electrohydrodynamics, electroosmosis, interfacial phenomena, conjugated materials, magnetic materials and multilayer soft lithography. While these microfluid handling techniques enable functional devices on microscopic length scales, they also impose unique constraints upon potential device capability, flexibility and performance. To fully integrate multiple fluidic processes within a single microsystem, methods for microfluid handling must be developed which are accommodating to fluids of complex and dynamic composition and are of comparable size to the processes into which they are being imbedded. By reducing the size of these physical units, large device arrays can be fabricated on the same "chip top" and will be capable of accomplishing chemical and biochemical tasks and analyses of vastly increased complexity on samples of microscopic quantity.

Development of devices that can function at these length scales has centered around complex fabrication schemes for intricate components such as gears, cantilevers and other microscale objects. The fabrication and actuation of these devices, however, has been limited to bulk environments external to microfluidic geometries. Because no practical implementation scheme has been developed for their incorporation into functioning microfluidic systems, they have not realized their suggested potential as microfluidic pumps and valves.

Colloidal Photonics

The controlled assembly of colloidal particles has received significant attention in recent years because of the potential application of nano- and micro-structured materials in many fields. Ordered colloidal systems have lattice spacings ranging from nanometers to microns and therefore can diffract ultraviolet, visible, and near-infrared light. One can take advantage of this property for a variety of applications, including sensors, narrow-band optical filters, optical switches, photonic band gap materials, waveguides, and other types of optical and electrooptical devices. Photonic crystals, spatially periodic arrays in a medium of different dielectric constant, are of particular interest and are designed to affect the propagation of electromagnetic waves in much the same way that semiconductors influence the movement of electrons. First proposed in 1987, they could lead to the miniaturization and high-speed performance of integrated circuits and have profound applications for telecommunications, lasers, fiber optics, data processing and display technologies, as discussed in the Basic Energy Sciences report "Nanoscale Science Engineering and Technology Research Directions" " . . . photonic-crystal structures have immense potential for a large variety of optoelectronics devices." In addition, this report points out the length scales required for manipulation of visible light: "To create photonic crystals operating at optical wavelengths the smallest feature sizes must be of the order of 100 nm, clearly in the realm of nanotechnology."

To date, the primary difficulty in the use of colloidal systems for such applications has been the fabrication of large arrays of colloidal particles into specific lattices with specific defect structures and tailored optical properties. Ordering in these systems is thermodynamically driven by colloidal interactions that may be predominantly attractive or repulsive, interactions that can often be readily tuned. For example, in a colloidal dispersion, repulsions can be modified by changing solution ionic strength and attractions can be influenced by solvent index matching or by varying salt concentration. However, development of technologically relevant colloidal crystals is hindered by the difficulty in uncoupling the variation of colloid-colloid interactions from the lattice structures that do form. Often for a specific application one wishes to manipulate colloidal surface chemistry, intervening fluid, or the specific colloidal material, all of which influence the nature of the crystallization process and may inhibit the formation of a particular lattice structure. A means of ordering colloidal particles that does not rely upon surface or particle chemistry will greatly aid the use of colloidal crystallization for technological applications. For this reason, the approach has been to aid and control the ordering of colloidal systems using applied external fields.

SUMMARY OF THE INVENTION

The present invention provides a device in which colloidal-size particles are utilized in a structure that is used to manipulate microfluidic streams or flows, including streams or flows in which particles are dispersed. Generally, a microfluidic device that utilizes colloidal-size particles comprises an input structure for receiving a microfluidic flow or stream, an output structure for transmitting a microfluidic stream, a space between the input and output structures, a colloidal structure located in the space, and a device for applying a field to the colloidal structure that causes the colloidal structure to move and thereby manipulate a microfluidic flow between the input and output structures. Among the possible fields that can be applied is an electrical field that has a component that is parallel to the direction in which an electrically charged colloidal structure is to move. Movement of the colloidal structure in this case is accomplished by electrophoresis. Another possible field is an electrical field that has a component that is normal to a plane in which two or more colloidal particles are substantially confined to two-dimensional movement. The electric field induces a dipole-dipole repulsive force between the colloidal particles. A further possible field is a magnetic field that has a component that is parallel to the direction in which a colloidal particle with a magnetic dipole is to move. Yet another possible field is an electromagnetic field. One technique for applying an electromagnetic field to a colloidal structure is known as an optical trap because light is used to hold a colloidal particle at a desired location or move a colloidal particle to a desired location. Among the optical trap techniques are optical "tweezers" and the scanning laser optical trap (SLOT) technique.

In one embodiment, a microfluidic two-way valve is provided in which the flow of a microfluidic stream between an inlet port and an outlet port is controlled by moving a colloidal particle between a position that blocks the flow and a position that permits the flow to occur. In one embodiment, two other colloidal particles that are fixed in place and an electrode structure for producing an electrical field with a normal component are utilized to move the colloidal particle to the desired position using dipole-dipole repulsion. In other embodiments, electrophoresis, magnetic fields and optical trapping are utilized to position a colloidal particle to control the flow between input and output ports. Valves having only one input port and multiple output ports, multiple input ports and a single output port, and multiple input and output ports are also feasible.

In another embodiment, a microfluidic pump is provided that is capable of pumping a microfluidic flow between the input and output structures. In one embodiment, a microfluidic peristalsis pump is provided that includes a closed loop that is disposed in the space between the input and output structures with a portion of the loop placed along a line between the inlet and outlet structures. The positions of a plurality of colloidal particles located in the closed loop is manipulated to achieve the pumping action. In one embodiment, one colloidal particle is moved from a point adjacent to the input structure to a point adjacent to the output structure along the noted portion of the loop to pump a portion of the microfluidic flow received at the input structure to the output structure. While this is occurring, two other colloidal particles are used to block any of the flow from entering the other portion of the closed loop. Once the first colloidal particle has completed the pump, the particles are rotated within the loop to pump the next portion of the microfluidic flow received at the input structure. Any of the various fields can be applied to position and move the colloidal particles. In another embodiment, a microfluidic peristalsis pump is provided in which colloidal particles are positioned in a string and the position of the colloidal particles in the string is manipulated over time so that the string goes through a sinusoidal type of motion that pumps a microfluidic flow. Another embodiment of a microfluidic pump that utilizes colloidal particles includes a rotating hub, an arm that extends from the hub, and a colloidal particle attached to the arm. Any of the noted fields are applied to move the arm and thereby achieve pumping action. In yet a further embodiment, two pairs of colloidal particles are manipulated to realize a two-lobe gear pump. More specifically, one pair of colloidal particles is rotated in a clockwise direction and the other pair of particles is rotated in a counter-clockwise direction to achieve the pumping action between the input and output structures.

The present invention further provides a photonic device that utilizes colloidal particles to manipulate light. Generally, the photonic device comprises a structure for strictly confining a plurality of colloidal particles to two dimensional movement. Typically, the structure is a pair of parallel plates and the colloidal particles are spherical. In such an embodiment, the plates are separated from one another by less than twice the diameter of the smallest diameter colloidal particle disposed between the plates, thereby substantially inhibiting the establishment of three-dimensional colloidal structures and substantially limiting movement of the colloidal particles to two-dimensional movement (i.e., strictly constrained movement). The photonic device further comprises a structure for applying an electric field that has a component that is normal to the plane in which the colloidal particles are confined. The application of such an electrical field to strictly constrained colloidal particles causes the colloidal particles to repel one another and thereby establish an order or crystalline structure among themselves. The photonic device further comprises a structure for directing light into the space occupied by the colloidal particles.

In one embodiment, a photonic waveguide is provided that allows light to be directed along a path through the colloidal particles. The photonic waveguide comprises the previously noted elements of a photonic device and a device for defining the path along which light is to propagate when the colloidal particles are in an ordered state. In one embodiment, a wall is established between the plates that prevents colloidal particles from being located in the space between the plates that is occupied by the wall. In another embodiment, the path is defined by an optical trap. The use of an optical trap allows the path along which light is to propagate to be changed over time. In another embodiment, a second electrical field that has a greater magnitude is used to define the path. Regardless of the structure used to establish the path, when no electrical field is being applied to the colloidal particles, the colloidal particles are in an unordered state that causes any light directed into the space occupied by the colloidal particles to be scattered. However, when an electrical field is applied to the colloidal particles, the colloidal particles enter an ordered state and light directed into the defined path propagates along the path.

In another embodiment, a photonic filter or switch is provided that utilizes the diffraction property of ordered colloidal particles. In one embodiment, the photonic filter or switch comprises the previously noted elements of a photonic device and a pair of polarizers that are crossed relative to one another, with one polarizer associated with each plate. When no electrical field is being applied to the colloidal particles, the unordered state of the colloidal particles prevents white light from passing through the crossed polarizers. However, when an electrical field is applied to the colloidal particles to place the particles in an ordered state, certain frequencies of white light are depolarized and capable of passing through both polarizers. By stacking such structures, different colors or changes in intensities are achieved. In another embodiment, the cross polarizers are eliminated. In this embodiment, when no electrical field is being applied to the colloidal particles, white light passes through both plates. However, when an electrical field is applied to the colloidal particles, white light directed to one of the plates is diffracted by the ordered colloidal particles such that an observers appropriately positioned relatively to the other plate will observe certain frequencies of white light, i.e., certain colors. This embodiment is also capable of being used to selectively reflect light.

BRIEF DESCRIPTION OF THE DRAWINGS

FIGS. 3A and 3B illustrate two structures for confining colloidal particles and applying a transverse electrical field to the particles so as to induce dipole-dipole repulsions;

FIGS. 4A–4B illustrate an embodiment of a microfluidic on/off or two-way valve that is actuated using an electrical field that creates a repulsive force between colloid particles that are part of the valve;

FIGS. 5A–5B illustrate an embodiment of a microfluidic three-way valve that is actuated using an electrical field that creates a repulsive force between colloidal particles that are part of the valve;

FIG. 6 illustrates an embodiment of a microfluidic three-way valve that uses electrophoresis to translate an electrically charged colloidal particle that is part of the valve;

FIGS. 18(1–12) illustrate an embodiment of a microfluidic passive check valve in which the valve is comprised of colloidal particles and the operation thereof within a fluid stream that changes directions;

FIGS. 19(1–12) illustrates an embodiment of a microfluidic flapper valve in which the valve is composed of colloidal particles and the position of the flapper valve is controlled by a non-invasive actuation technique;

FIGS. 20A–20C illustrates that colloidal particles are capable of being strongly attracted to one another or strongly repelled from one another using electrical fields;

FIGS. 21A–21D illustrates the ability to selectively position colloidal particles using a scanning laser optical trap (SLOT) technique;

FIGS. 22A–22B respectively illustrate the selective positioning of colloidal particles using a SLOT technique and the locking of the colloidal particles in place using polymerization;

FIGS. 23A–23C illustrates the increase in the attraction of colloidal particles to one another with an increasing electrical field;

FIG. 24A illustrates a structure for confining colloidal particles in which electroosmotically induced attractions between the particles predominates;

FIG. 24B illustrates a structure for confining colloidal particles in which induced dipole-dipole repulsion between the particles predominates;

FIGS. 25A–25D illustrate the difference in colloidal structures achieved by the application of a normal electric field when the confining structure varies from a structure that permits three-dimensional movement of the particles to a confining structure that permits substantially only two-dimensional movement of the particles (i.e., a strictly confining structure);

FIGS. 30A–30C illustrate diffraction patterns observed with no electric field being applied to a colloids within a strictly confining structure, with an electrical field being applied for only a relatively short amount of time to the structure; and with an electrical field that has been applied for a relatively long amount of time to the structure;

FIG. 31A illustrates one embodiment of a structure for producing dipole-dipole repulsions between colloidal particles that employs a strictly confining structure;

FIG. 31B illustrate another embodiment of a structure for producing dipole-dipole repulsions between colloidal particles that employs a strictly confining structure;

FIGS. 32A–32C respectively illustrate the manner in which a photonic device in which colloidal particles are strictly confined is utilized to satisfying the photonic band gap condition and thereby realize a photonic waveguide;

FIGS. 35A–35B respectively illustrate the TM and TE gap maps for a triangular lattice of $TiO_2$ in air (r/a=0.225);

FIG. 36 is a combined map of the maps in FIGS. 35A and 35B;

FIGS. 37A–37C illustrate various honeycomb lattices;

FIGS. 38A–38C respectively illustrates a photonic switch/filter that utilizes crossed polarizers, photonic switch/filter that diffracts light, and a photonic filter/switch that reflects light;

DETAILED DESCRIPTION

Figure 1:
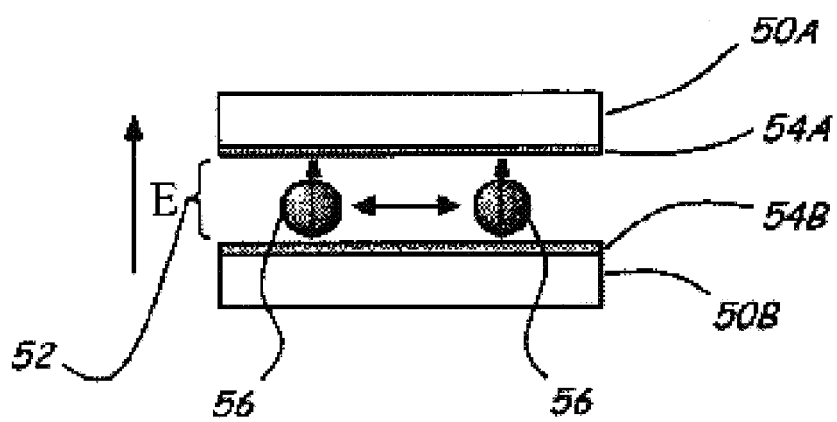
FIG. 1 illustrate a structure for confining colloidal particles and applying a transverse electric field to the confined particles so as to induce dipole-dipole repulsions between particles.
Figure 2A:
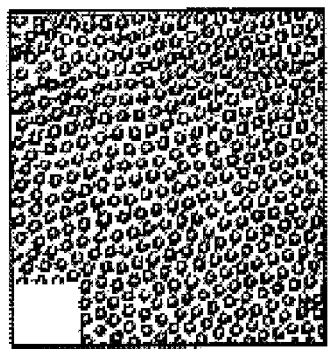
FIGS. 2A–2D illustrate the decrease in colloidal ordering of particles in a confining geometry as the electric field is decreased.
Figure 2B:
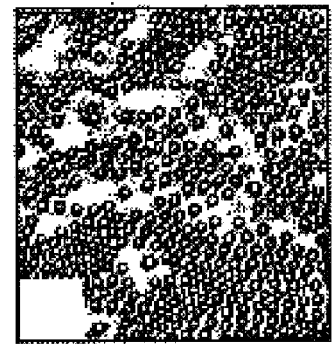
Figure 2C:
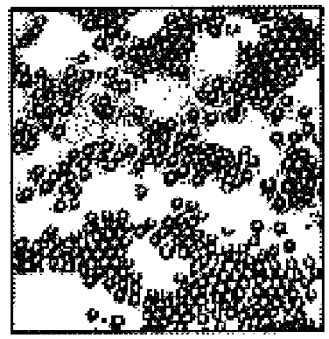
Figure 2D:
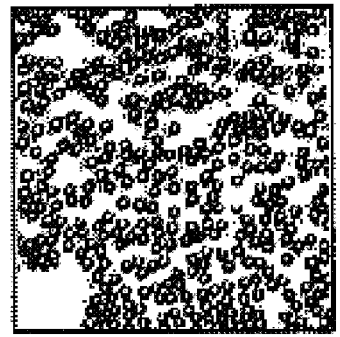

Described is the application of colloidal manipulation techniques using fields for the purpose of fluid control on the microscale. Colloidal particles, a generic term describing micron and submicron sized bits of solid matter suspended in a fluid medium, can respond to the application of external fields. Charged colloidal particles will migrate in an electric field due to the electrophoretic body force exerted by the field. Similarly, magnetizable particles can be translated or aligned with magnetic fields. Additionally, a monodisperse suspension of colloidal particles confined between two plates separated by roughly a single particle diameter will repulsively order in the presence of an electric field applied perpendicularly to the confining plane. Furthermore, colloidal particles can be trapped and manipulated individually with focused laser beams; a technique commonly referred to as "optical trapping" or "optical tweezing". These four methods of colloidal particle manipulation are used to direct the control of fluids within microscale fluids handling devices.

In addition to their diminutive size, colloidal particles posses many qualities which would make their integration into $\mu$TAS desirable. For example, microspheres can be easily synthesized to tailor their size and morphology. Chemical moieties may also be attached to colloidal surfaces with relative ease, allowing for the tuning of surface charge or to make them chemically reactive with a target specie. Even individual whole cells may be targeted with antibody-functionalized colloids. Indeed, microspheres have begun to appear in microanalytical systems as chromotagraphic beds, protein digestion beds, vehicles for reagent delivery, and immunoassays.

Colloidal microspheres also posses an additional property that makes their integration into $\mu$TAS revolutionary: the ease with which they can be manipulated by non-contact, non-invasive techniques that take advantage of the application of external fields. Traditionally, the inevitable interface to the macroscopic world has been the limiting factor in the development of smaller Microsystems. However, discussed hereinbelow are microfluidic devices in which the translation of colloidal microspheres with external fields allows for the precise manipulation of fluids within microfluidic channels with no external contact.

As previously discussed, charged colloids experience an electrophoretic force in the presence of an electric field; therefore, it is possible to use electric potential as a means to position microspheres as desired and subsequently regulate flow in microfluidic systems. Similarly, magnetizable particles may be translated in magnetic fields and applied for the same fluid control purposes. Once the required channel geometry has been fabricated and the colloidal particle isolated within, the resulting device is actuated by one of four methods that involve the direct manipulation of the particle by an applied field.

Actuation

Method A—Electrophoresis

Given an electric field E and a particle of charge q, the colloid will move with velocity $v_p$ against a fluid flowing with velocity U midway between two parallel plates of separation 1:

$$v_p = \sqrt{\frac{qE\left(1 - 1.004\left(\frac{a}{l}\right) + 0.418\left(\frac{a}{l}\right)^3 + 0.21\left(\frac{a}{l}\right)^4 + 0.169\left(\frac{a}{l}\right)^5\right)}{6\pi\mu a}} - U \quad (1)$$

Though derived for a parallel plate geometry, this equation indicates the decreasing particle velocity one obtains as the channel width approaches the colloid diameter. From this equation though, it is still found that small voltages are required to translate a moderately charged 10 $\mu$m diameter particle in a narrow channel against moderate fluid flows. In using electrophoresis for actuation, colloids move in the direction of, and not normal to, the direction of the applied electric field.

Method B—Electric Field Applied in the Normal Direction

As illustrated in FIG. 1, strong lateral repulsions can be induced by an electric field applied normal to the plane of colloid translation. The structure illustrated in FIG. 1 is comprised of first and second coverslips 50A, 50B that are separated from one another and define a space 52, first and second electrodes 54A, 54B for applying an electric field to the space 52 that extends substantially perpendicular to the planes of the coverslips 50A, 50B, and colloidal particles 56 that are substantially constrained to two-dimensional movement within the space 52 due to the spacing between the coverslips 50A, 50B. The strength of this interaction can be expressed as $$\phi(r, \theta) = -\frac{u^2}{4\pi\varepsilon\varepsilon_0 r^3}(2\cos^2\theta - \sin^2\theta) \quad (2)$$

for aligned point dipoles, where $\phi(r,\theta)$ is the interaction energy, u is the induced dipole moment, $\epsilon$ and $\epsilon_0$ are the dielectric permittivity of the medium and free space, respectively, r is the separation distance and $\theta$ is the angle between the field and dipole center line. The strength of the dipole can be related to the electric field strength E via u=$\alpha$E, where $\alpha$ is the electric polarizability of the colloid. From Equation 2 it is clear that the interaction is strongest when $\theta$=90°. Using this approach, concentrated dispersions can be made to order as shown in FIG. 2.

Previous studies have shown that electric fields can be used to induce colloid/colloid repulsions in such colloidal systems. These studies however, used an experimental configuration that limits practical application. Specifically, and as illustrated in FIG. 3A, these previous experiments placed glass coverslips 50A', 50B' (of thickness ~150$\mu$) on either side of the sample and between the electrodes 54A', 54B' used to apply the fields. Because of this, an extremely high voltage of 800V was required to apply a field of approximately 0.2 V/$\mu$ in the colloidal fluid. As illustrated in FIG. 3B, this approach changes the position of the intervening cover slips and places the electrodes in contact with or nearer the colloidal fluid thereby providing the following advantages:

1) Significantly higher electric fields are achievable within the fluid by applying much lower, practical voltages. For example, ten times the electric field is obtained by applying only 5V across the electrodes (less than 1/100th of other studies). As shown in Equation 2, the colloidal interaction strength is proportional to the electric field squared, $\phi(r,\theta)$~$u^2$~$E^2$; therefore, ten times the applied field corresponds to 100 times the interaction strength; and 2) Because interaction strengths are much greater, colloidal movement due to repulsions occurs rapidly, seconds for micron-sized colloids as opposed to approximately an hour in previous investigations.

Method C—Magnetic Field Translation

It has been shown in a number of studies that application of a magnetic field will induce a dipole $\mu$ in magnetizable or polarizable particles. As in the case of electric fields, the dipole strength is directly proportional to the strength of the applied magnetic field. Such a dipole, depending on strength, will interact in a similar fashion to electric-field induced dipoles.

Method D—Actuation with Optical Traps

In 1970, Ashkin discussed and demonstrated the feasibility of optical or laser tweezers. In this technique, a single laser beam is focused through an objective at an object, which because of an index of refraction mismatch, redirects the focused beam. This redirection induces a change in light momentum, a change that must be balanced by the object. The net effect of this phenomenon is the holding of small micron-sized objects in the brightest part of a laser beam's focus. This technique has been used extensively in recent years to manipulate the morphology of multiple colloidal particles simultaneously by rapidly moving the trapping laser beam. This ability is easily extended to microfluidic device actuation. By translating the trap, colloids can be repositioned or translated in any given manner.

Valves

A long pursued yet elusive goal of microfluidics designs is reliable, controllable valving systems. Through the use of colloidal microspheres elegant, reversible, and tightly sealing valves are constructed that may be controlled by electrical, magnetic, or optical means.

Three-way Valve

A single translating colloid in a fabricated chamber with electrodes can act as a directional valve. This idea is illustrated in FIGS. 4A–B, FIGS. 5A–D, and FIG. 6, where a colloid is moved to either side of the chamber and used to alter the direction of flow. In FIGS. 4A–4B, a valve 58 is illustrated in which the dipole-dipole repulsion technique is utilized to control a microfluidic flow between an input port 60 and an output port 62. The valve 58 comprises fixed colloidal particles A, B and a movable colloidal particle 64. Application of electrical energy to a first electrode pair 66A induces a repulsion between colloidal particle A and the movable colloidal particle 64 that places the colloidal particle 64 in a position to block a microfluidic flow between the input and output ports 60, 62. Application of electrical energy to a second electrode pair 66B creates a repulsion between the colloidal particle B and the movable colloidal particle 64 that opens the valve and permits a microfluidic flow to pass between the input port 60 and output port 64. The coverslip structures are not shown. Steps in the electrode pairs 66A, 66B prevent the movable colloid particle 64 from contacting the colloidal particles A, B in a damaging manner.

It should be appreciated that the movable colloidal particle 64 can be moved between blocking and unblocking positions using the other non-invasive actuation techniques. In the case of electrophoresis, the particle 64 is electrically charged and a pair of electrodes is appropriately positioned to actuate the particle 64. Similarly, magnetic field activation employs a particle 64 in which the application of a magnetic field induces a magnetic movement in the particle 64. Electro-magnetic structures or other magnetic field application structures are appropriately positioned to apply the magnetic field. Likewise, electro-magnetic manipulation of the particle 64 is facilitated by structure associated with optical traps and the like. It should be appreciated that the electrophoresis, magnetic field and electromagnetic field approaches do not require colloidal particles A, B.

FIGS. 5A–5B illustrate a three-way valve 68 that employs the concepts of the two-way valve illustrated in FIGS. 4A–4B. It should be appreciated that the roles of the two inlet ports and the outlet port could be reversed. Further, valves that use colloidal particles and have multiple input ports and multiple output ports are feasible.

FIG. 6 illustrates a three-way valve 70 that uses three electrodes 70A–C to position an electrically charged colloidal particle 72 so as to control a microfluidic flow between an inlet port 74 and outlet ports 76A, B. The actuation technique in this case is electrophoresis.

Actuation

Actuation can be achieved via all Methods A through D discussed above. Method B is illustrated in FIG. 4 and FIG. 5 and Method A is illustrated in FIG. 6.

3-D Valve

Figure 7:
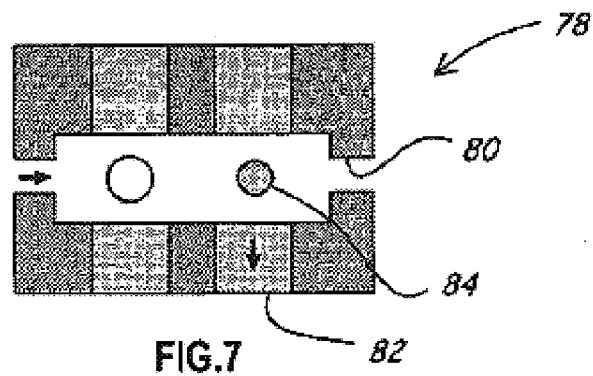
FIG. 7 illustrates an embodiment of a microfluidic three-dimensional valve in which an inlet structure is located in a first plane, an output structure that is located in a second plane, and a fluid communication between the inlet and outlet structures that is opened or closed by the selective positioning of a colloidal particle.

The three-dimensional valve 78, so named because it is capable of selectively and precisely delivering reagents from a channel 80 in a first plane to a channel 82 in a second plane via a pathway 84 it also requires external manipulation to govern flow. An active microsphere 84 is positioned by electrical, magnetic, or optical translation over the desired gate, thus terminating flow to the channel below (see FIG. 7). In this figure, two gray channels flow beneath the inlet white channel. Depending on the position of the black colloid, fluid can be directed from the inlet to either outlet gray channel below.

Actuation

Actuation can be achieved via all Methods A through D discussed above.

Pumps

The following presents the general concepts for using field manipulated colloidal particles to serve as microscale pumps as well as a few representative designs that may be used to drive fluid flow directly within microfluidic channels.

Peristalsis Pumps

Figure 8:
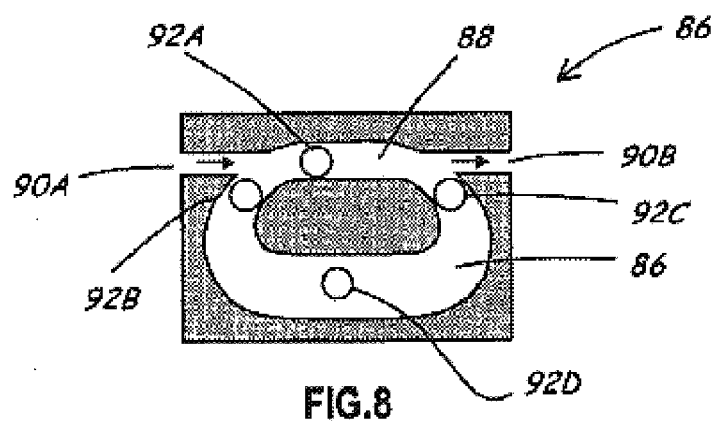
FIG. 8 illustrates a first embodiment of a microfluidic peristalsis pump that employs colloidal particles whose positions within a closed loop are manipulated by a non-invasive actuation technique.

Reciprocating peristalsis-like pumps can be created in which colloidal particles moving within a specifically conceived and fabricated microchannel displace discrete slugs of fluid, resulting in continuous pumping. Such pumps are manufactured by isolating multiple microbeads within microchannels of specific geometry, such as pump 86, which is shown in FIG. 8. The pump 86 comprises a closed loop 86 with a portion 88 that is aligned with an inlet port 90A and an outlet port 90B. Colloidal particles 92A–D are translated by one of the noted non-invasive techniques to achieve the pumping action. In the illustrated embodiment, colloidal particle 92A is translated to move a portion of a microfluidic flow between the inlet and outlet ports 90A, 90B. Colloidal particles 92B, 92C are positioned to prevent any of the microfluidic flow being pumped by the colloidal particle 92A from entering the portion of the loop other than portion 88. Once particle 92A has completed the pumping of a portion of the flow, the positions of the particles are cycled to start pumping another portion of the flow or stream. The translation of a microsphere across the top of the device, which are matched in size, will translate a plug of fluid forward through the channel. In order to move the colloids within the pump, the driving field must be continuously oscillated. This type of microfluidic conveyance scheme has been previously proposed and successfully realized with tiny air bubbles in microliter and nanoliter scale devices, however, the design disclosed herein allows for significantly smaller quantities of fluid to be pumped. In fact, sub $\mu l$/min flow rates are predicted for typical-sized colloids, a rate that is comparable to those achievable using electroosmotic approaches but not restricted to fluids of specific ionic concentration. The incorporation of multiple microspheres in the design accomplishes two goals: 1) particles are held below the main channel opening to assure flow down the outlet channel, and 2) particles can be translated at varying rates to control flow rates. In addition, colloids of specific geometry are constructed using a "microprototyping" approach. This approach, which is described in detail later, relies upon the in situ radiation initiated polymerization of a hydrogel-based solution. This ability allows for the creation of customized colloidal pump elements that provide tight tolerances relative to the channel and pump fluids in the most efficient manner.

Actuation

Actuation can be achieved via all Methods A through D discussed above.

Rotary Pump

Figure 9:
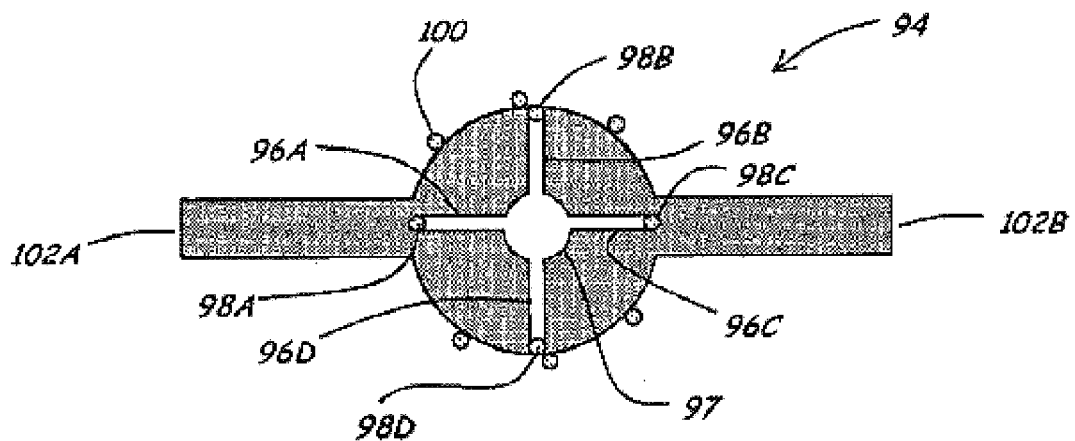
FIG. 9 illustrates an embodiment of a microfluidic rotary pump that employs colloidal particles.
Figure 10:
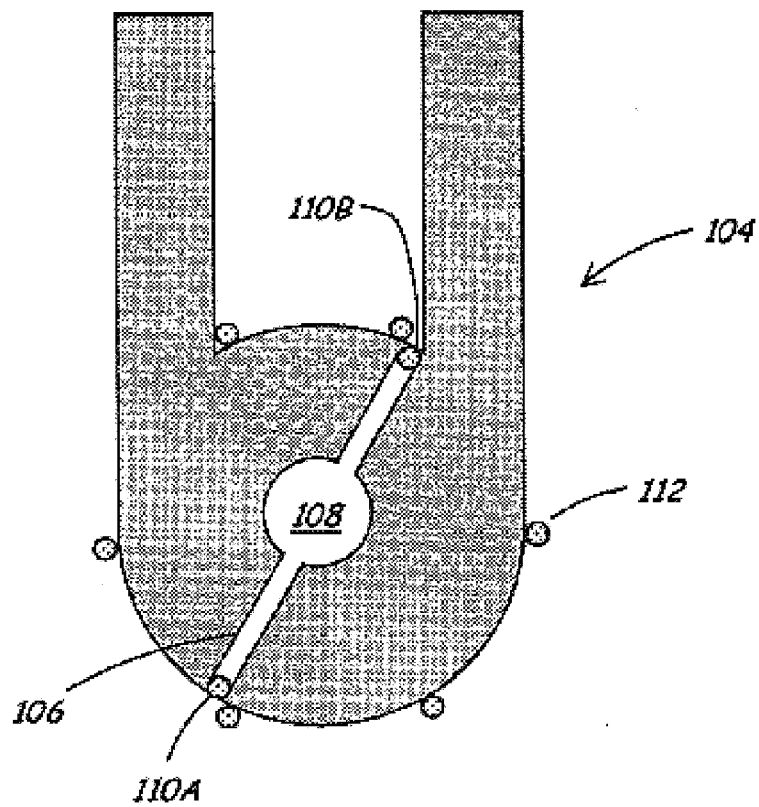
FIG. 10 illustrates an embodiment of a microfluidic vane pump that employs colloidal particles.

As previously mentioned, functional hydrogel structures are created in situ through a technique called microprototyping. This technique provides not only the ability to create structures of custom geometry but also provides the ability to embed colloidal particles within the matrix. This powerful technique allows the fabrication of structures such as the exemplary rotor pump 94 shown in FIG. 9, in which the rotor vanes 96A–D that rotate about hub 97, terminate in colloidal particles 98A–D. Correspondingly, other colloidal particles 100 are embedded in the microchannel walls. Given that the vertical spacing within the microchannel is comparable to the particle diameter, these complementary particles repel each other when a perpendicular electric field is applied, as previously discussed. As the particles are repelled, the rotor, which can spin freely upon a center post that is anchored to the microchannel, is actuated to pump a microfluidic flow between input and output ports. By patterning discrete electrodes (not shown) over each particle, individual fields can be turned on and off over appropriate particles as the rotor spins past them, thus perpetuating the rotor motion. By moderating the field, particle spacing or the frequency of field application, the velocity and direction of the rotor can be readily controlled. Fluid conveyance devices such as the rotor described here are appropriate for application in devices in which the precise delivery of suspended solids is required.

Actuation

Actuation can be achieved via all Methods A through D discussed above. The electrophoresis, magnetic field and electromagnetic field approaches do not require colloidal particles to be embedded in the microchannel wall around the rotor.

Vane Pumps

Similar in concept and operation to the rotary pumps, the vane pump 104 represents the true miniaturization of a classical macroscopic fluids handling technology, and is appropriate for the controlled pumping of any fluid sample. A single vane 106 that rotates about a hub 108 will be fabricated and colloidal particles 110A, B will be embedded in the ends of the vane. Complementary particles 112 are also built into the channel walls, allowing for the repulsive force to be generated by a perpendicularly applied field.

Both the rotary pump and the vane pump may also be actuated directly by electrophoretic force. In this case, no particles are built into the channel walls, only the vanes. The application of oscillating electric fields, as those used to generate colloidal motion in the peristalsis pump will drive the rotary action. Both designs may also be fabricated without colloidal inclusions, in which case they are actuated by a rastered laser beam generating a dynamic radiation pressure.

Actuation

Actuation can be achieved via all Methods A through D discussed above.

Mixers

The ability to mix efficiently at the microscale would provide significant advantage for many microfluidics applications such as the "laboratory on a chip". Mixing at small length scales however, is subject to some unique limitations associated primarily with the difficulty in achieving turbulent flows and the associated mixing efficiencies. For a fixed flowrate Q, such as that associated with a colloid-based mixer, it can be shown that the Reynolds number is inversely proportional to the gap diameter.

$$\mathrm{Re} = \frac{\rho \bar{v} D}{\pi} = \frac{4\rho Q}{\pi D \mu} \qquad (3)$$

With good registry between the colloid diameter and the channel width, significant Reynolds numbers may therefore be achieved. A mixer 114 is substantially identical to the three-way valve shown in FIGS. 5A–5B. The movement of the movable colloidal particle is controlled so as to provide the desired mixture of flows received at the input ports to the output port.

Actuation

Actuation can be achieved via Methods A through D discussed above.

Fabrication Approaches

Microfluidic systems ($\mu$FS) are traditionally fabricated by the wet or dry etching of silicon or silicon dioxide substrates. Because transparency and low channel aspect ratios are indispensable in certain situations, however, a procedure in which plasma etched silicon wafers are used as templates for the creation of replicas cast in poly(dimethylsiloxane) (PDMS), a clear elastomeric material, has been adopted. The following describes the methodology used to create such elastomeric microfluidic networks, however, the fabrication of the individual devices and cells described is not limited to PDMS substrates. Because glass, silicon and other materials from which microfluidic systems are commonly manufactured may be used instead of PDMS, the generic processing operations by which a typical device may be fabricated from any substrate material are initially described. The utility of PDMS and the specific procedure by which devices are made from this material are then described.

Photolithography

Photolithography describes the general process of using radiation to produce a desired pattern in a photosensitive material. Templates of microchannels ($\mu$Chs) and microfluidic networks ($\mu$FNs) are created lithographically with ultraviolet (UV) light by transposing the pattern of a chrome mask upon UV sensitive negative photoresist. The patterns are subsequently developed in an appropriate solution, leaving only the relief of the desired pattern, which may be used directly as a PDMS master or etched to produce a permanent master. If used as the structural material to directly create PDMS replicas, photoresist films may be readily prepared with thickness from 100 nm to 100 $\mu$m, thus providing a wide range of accessible aspect ratios.

Reactive Ion Etching (RIE)

Reactive ion etching (RIE), commonly referred to as plasma etching, is employed to either etch channels into glass or silicon or to create permanent masters for PDMS replication in silicon wafers. RIE is favored over wet etching techniques in many applications because it provides $\mu$Chs of variable aspect ratio as low as one with relatively straight walls and rapid etch rates. Due to the isotropic nature of wet etching with hydrofluoric acid (HF), the maximum possible aspect ratio (channel height divided by width) is 0.5. Anisotropic wet etching with potassium hydroxide (KOH) will selectively etch along silicon's (1,1,1) crystal face producing features with vertical walls, however, the etch rate is slow relative to those available vie RIE.

Metal Deposition

Electrodes and control circuitry created from thin films of aluminum, copper or gold may be lithographically templated upon microfluidic chip substrates by two principle methods: evaporation and liftoff or evaporation and "peel-off". Evaporation and liftoff is a conventional technique appropriate for the deposition of metals upon rigid substrates such as silicon or glass. The desired pattern is photolithographically generated in positive photoresist before metal is evaporated and deposited over the entire substrate. Finally, the metal-coated photoresist is stripped in an appropriate solvent, such as acetone, leaving only the original pattern. Evaporation and liftoff is an efficient means of creating intricate circuitry upon rigid microfluidic chip faces, however, it is inappropriate for flexible chips cast in PDMS. Therefore, a technique referred to herein as shadow mask "peel-off" is employed to replace photoresist lift off. Instead of patterns created in photoresist, a negative relief mask is cast by spin coating PDMS onto etched silicon wafers to depths less than that of the features on the master. This shadow mask is then peeled from the master and placed upon the PDMS microfluidic chip replica and metal is deposited over the entire system. When the shadow mask is peeled from the PDMS chip, the desired circuitry pattern remains.

Soft Lithography

Soft lithography describes the generic replication of a mold in PDMS. PDMS replicas are created using a commercially available two-component kit (Sylgard 184 Kit, Dow Corning). A mixture of elastomer and curing agent are poured over the silicon master and cured under vacuum to degas the elastomer solution. PDMS makes an ideal candidate for $\mu$FS production because it can be cured rather rapidly, patterns are faithfully reproduced and the process can be conducted in a non-clean room environment. Furthermore, the design and fabrication of $\mu$FNs becomes increasingly flexible as masters may be fabricated with more complex designs and lithography need not solely be relied upon.

Cured PDMS replicas are peeled from the master, leaving a clean, reusable template. The replica is finally placed in conformal contact with either a glass slide or PDMS flat forming a tight, reversible seal and enclosing channels capable of conveying fluids. PDMS is natively hydrophobic, but can be easily modified to create a hydrophilic surface through brief exposure to an oxygen plasma. Replica films >50 $\mu$m may also be created by spin coating PDMS onto a silicon master. Such films may be used as shadow masks for the deposition of metal features, such as electrodes, onto other replicas or multiple films may be stacked to create three-dimensional $\mu$FNs. Such a three-dimensional, stacked channel configuration may also be readily exploited within the context of a colloid-based fluid control platform to regulate the flow of fluids within the z-dimension.

Rapid Prototyping

A combination of techniques discussed above, photolithography and soft lithography, has been previously utilized in conjunction with the creation of high-resolution shadow masks as an experimental fabrication method in which proposed designs may be conceived, tested and manufactured within the span of a single day. This process, which is limited to fairly large microstructures (>15 $\mu$m) by the resolution of available printers or image setting techniques, has been dubbed "rapid prototyping", and allows for quick inexpensive testing of design options. In the process, masks are drafted using commercial software, such as Macromedia Freehand, Quark Express or Adobe Illustrator, and printed on a transparency or image set on photographic film, which is then used as a shadow mask to replicate the design in negative photoresist. As etching of the design into the silicon is not required to make a single-use master, a PDMS replica is cast directly upon the photoresist, thus generating a "rapid prototype" microfluidic network.

Optical Trapping

As discussed above in Actuation Method D, optical trapping can be used to directly manipulate colloidal particles in solution. Recent developments have focused on the creation of simultaneous multiple optical traps. Multiple traps permit asymmetric objects to be spatially oriented, or the manipulation of two or more objects or two parts of the same object simultaneously in order to measure forces, dynamics or mechanical properties. This can be accomplished by rapidly scanning a single laser beam among a number of positions with galvanomirrors or piezoelectrics to create a time-averaged trapping pattern. This approach has been applied to build a scanning laser optical trap (SLOT) to simultaneously manipulate multiple colloids into any designed pattern. In this, when the laser is turned off, the particles diffuse away, reassuming their equilibrium distribution. Examples of trapping multiple particles simultaneously are shown in FIG. 12.

Photopolymerization and "Microprototyping"

Figure 11:
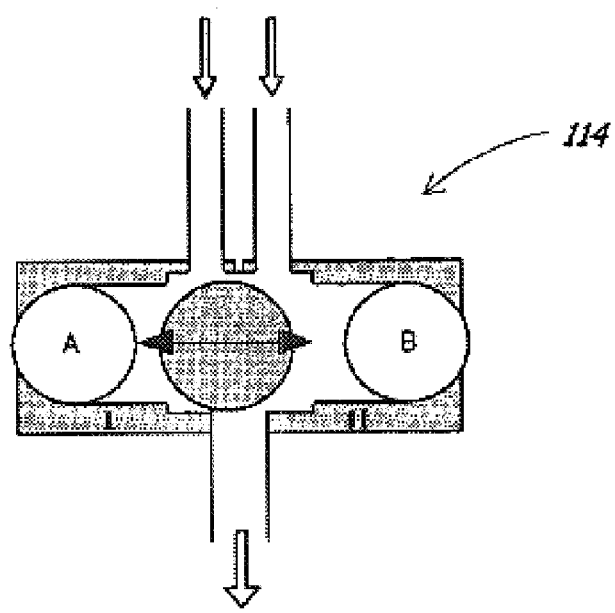
FIG. 11 illustrates an embodiment of a microfluidic mixer that employs colloidal particles.
Figure 12A:
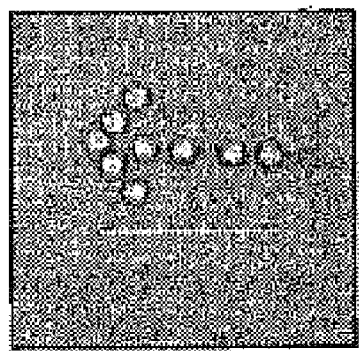
FIGS. 12A–12D illustrate various patterns of colloidal particles that are established using a scanning laser optical trap (SLOT) technique.
Figure 12B:
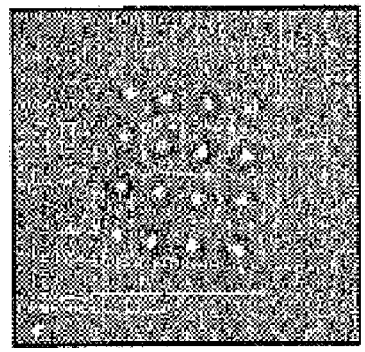
Figure 12C:
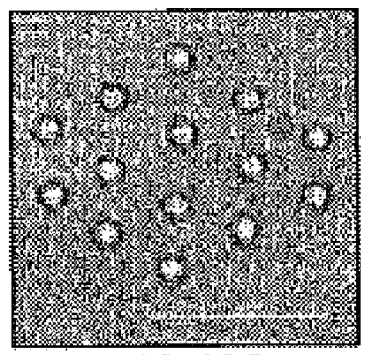
Figure 12D:
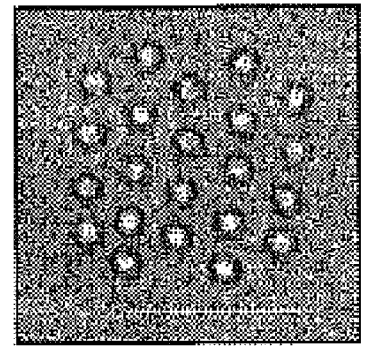
Figure 13A:
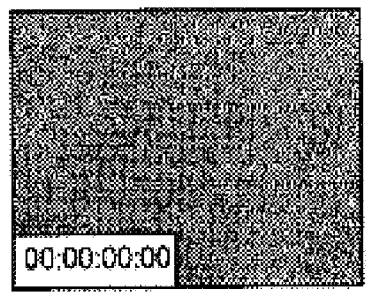
FIGS. 13A–13D illustrates a microprototyping technique in which colloidal particles are positioned using a SLOT technique and fixed in relative position to one another by polymerization.
Figure 13B:
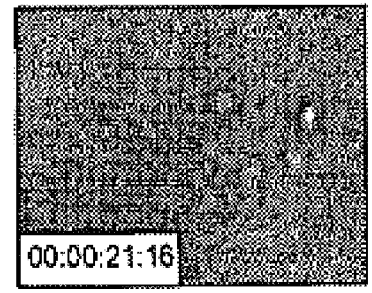
Figure 13C:
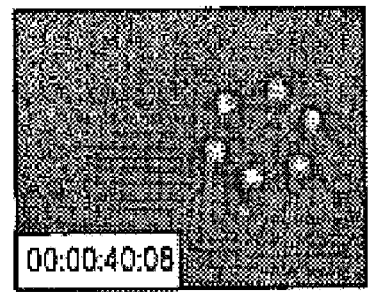
Figure 13D:

As discussed above, the SLOT technique can be used to position colloidal particles in desired orientation with excellent precision. Once the laser beam is switched off, however, the trapped colloids will diffuse away from their specific positions. To prevent this, these particles are locked into desired orientations by polymerizing the surrounding solvent while scanning the laser beam. In addition to precise isolation of colloidal particles within a polymerized hydrogel matrix, an approach in which very local and specific regions of a hydrogel solution are polymerized to create individual micron-sized hydrogel entities within microfluidic systems has been developed. This "microprototyping" approach is illustrated in FIG. 11 where a polymerizing laser beam is scanned through a dilute acrylamide solution to create an array of approximately 1.5$\mu$ colloids for subsequent optical manipulation. In FIG. 11, the entire process, from dilute monomer solution to rapidly manipulated polymerized object, takes little more than one minute. The flexibility of this approach is clearly tremendous; it provides the ability to rapidly fabricate any microscale design, and because the index of the polymer is higher than the solvent, subsequently manipulate fabricated objects optically.

This technique provides a nice route towards the construction of microscale devices within previously fabricated microchannels. Here, microchannels will be first filled with polymerizable solvent, devices fabricated directly within them, and finally the network flushed with an alternate fluid leaving the microprototyped object behind. This technique can be applied as a means for constructing templates for lithography or as a starting point for creation of larger three-dimensional colloidal structures for applications such as materials for photonics, lithography, ceramics, and biochemical sensors.

Device Fabrication

The above operations may be combined in a variety of ways in order to fabricate the microfluidic devices and systems described herein. If manufactured from silicon, silicon dioxide or other stiff materials, the substrate upon which the microfluidic network is etched must be sealed with a flat substrate. If replicated in PDMS, the microfluidic network may be sealed by simply placing the PDMS in conformal contact with a flat substrate of sufficiently high surface energy, including a PDMS "flat".

Previously synthesized colloidal particles may be included into the microfluidic system either before or after sealing by a variety of techniques. A representative strategy of isolating a particle in a chamber would be to flow colloidal particles suspended in a hydrogel solution through a parallel channel, grab a single particle with an optical trap, move it into the chamber through an access channel and then seal the access channel by photopolymerizing the channel via the microprototyping approach.

As previously mentioned, particles may also be synthesized directly within channels by the microprototyping approach. To achieve this, a microfluidic network is created, sealed, and filled with a hydrogel solution. This solution is next polymerized using the microprototyping technique or an adaptation of photolithography. Microprototyping allows for the creation of objects of arbitrary morphology, while a photolithography approach would reproduce the design of a shadow mask in the hydrogel. To create freely movable hydrogel features using the photolithography method, one must first apply a sacrificial layer, such as positive photoresist, to the flat substrate. This step is required because hydrogel polymerization begins at the bottom substrate, resulting in attached polymer. To liberate the polymer feature, a sacrificial layer must be placed between the feature and the substrate, so that when it is dissolved, the hydrogel maintains its integrity and form while becoming detached from the substrate.

The basic operations used in the creation of field actuated microfluidic devices have been described. Most of these steps have been adopted from the microelectronics processing industry and have been established for years. Also described is a representative method by which completed devices may be assembled using less conventional or in certain cases novel techniques.

By manipulating colloidal microspheres within customized channels, micron-scale fluid pumps and particulate valves have been created. Two positive-displacement designs, a gear and a peristaltic pump, are reported hereinafter, both of which are approximately the size of a human red blood cell. Two colloidal valve designs are also demonstrated, one actuated, one passive, for the direction of cells or small particles. The use of colloids as both valves and pumps will allow device integration at a density far beyond what is currently achievable by other approaches and may provide a link between fluid manipulation at the macro- and nano-scales.

The complexities inherent to other approaches are avoided by employing colloidal microspheres as the active flow control element. These materials provide an excellent choice because they can not only be synthesized at length scales that make them easily transported through microfluidic networks, but their surface chemistry may also be readily altered compatibilizing them with a great variety of solvents. These attributes allow them to be used in a host of microfluidic applications.

It has also been shown that colloids can be directly manipulated through the application of external fields. The processes of electrophoresis, dielectrophoresis, and magnetophoresis have all been used to control and influence the motion of small particles in solution. Particularly useful for preliminary studies, however, another technique, optical trapping, has become popular because it allows the direct manipulation of individual colloids. This non-contact, non-invasive technique eliminates the need to physically interface to the macroscopic world, and thus circumvents one traditional obstacle to microfluidic device miniaturization. In order to manipulate complex asymmetric objects or multiple objects at once, as would be required for the actuation of a microfluidic valve or pump, a large number of optical traps are simultaneously required. To accomplish this, a scanning approach in which a piezoelectric mirror is translated to rapidly reflect a laser beam in a desired pattern is used. If the piezoelectric mirror is scanned over the desired pattern at a frequency greater than that associated with Brownian time scales, a time-averaged trapping pattern is created. The details of this approach, called scanning laser optical trapping (SLOT), can be found elsewhere. Through the application of this dynamic trapping capability, the microspheres are arranged into functional structures, and subsequently actuate these structures to generate microfluidic pumping and valving. Employing an optical actuation scheme and transmission microscopy to monitor device performance, however, requires a method for the creation of channels at single micron length scales in a transparent housing. Because of this requirement, soft lithography techniques pioneered by the Whitesides group are applied, which allow for the inexpensive fabrication of microfluidic networks in poly(dimethylsiloxane) (PDMS), an optically transparent elastomer.

Working at microscopic length scales offers unique challenges for colloidal pump design. This is illustrated through calculation of the Reynolds number, $Re=\rho vD/\eta$, where for colloidal length scales in aqueous solutions, $\rho=1$ g/cm$^3$, $\eta=0.01$ g/cm·s, D~5 μm, v~5 μm/s, giving $Re \sim 10^{-5} \ll 1$ and corresponding to laminar flow. Under these circumstances fluid flow is fully reversible and pump designs that rely on centrifugal action, such as impeller-type approaches, are inappropriate. For this reason the designs are based on positive displacement pumping techniques that operate by imparting forward motion to individual plugs of fluid.

Figure 14:
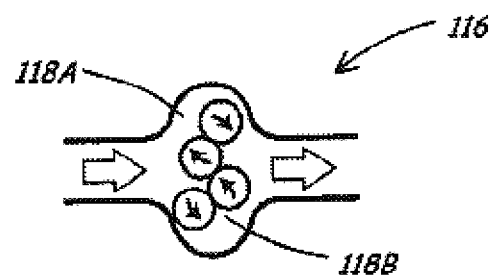
FIG. 14 illustrates an embodiment of a microfluidic two-lobe gear pump that employs colloidal particles.
Figure 15:
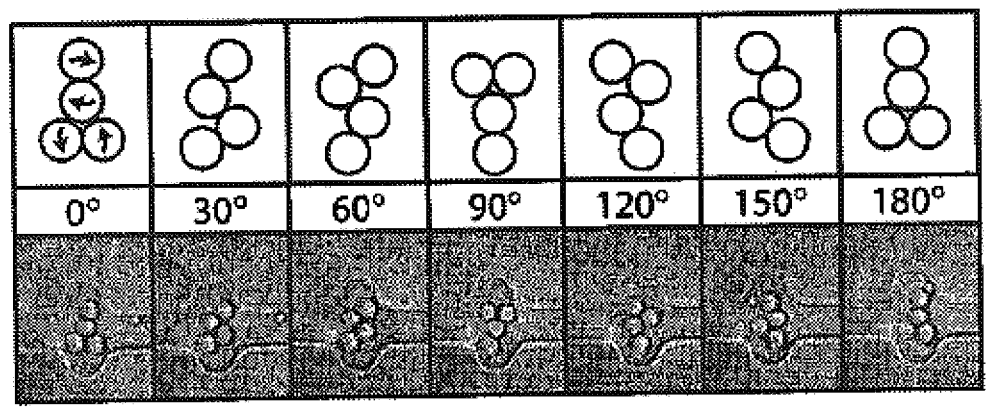
FIG. 15 illustrates the operation of the microfluidic two-lobe gear pump shown in FIG. 14 in 30° increments.

With reference to FIG. 14, the first design is a two-lobe gear pump 116 in which small, trapped pockets of fluid are directed through a specially-designed cavity fabricated in a microchannel by rotating two colloidal dumbbells or "lobes" 118A, B in opposite directions. Over repeated and rapid rotations, the accumulated effect of displacing these fluid pockets is sufficient to induce a net flow. This motion is illustrated in FIG. 15, where clockwise rotation of the top lobe 118A combined with counterclockwise rotation of the bottom lobe 118B induces flow from left to right. In the experiments also shown in FIG. 15, each of the lobes consisted of two, independent 3 μm silica spheres. To create these structures, the colloids were first maneuvered using the optical trap to a 3 μm deep section of channel designed with a region of wider gap to accommodate lobe rotation. Once the particles were properly positioned, the laser was scanned in a manner such that a time-averaged pattern of four independent optical traps was created, one for each microsphere comprising the two-lobe pump. By rotating the two traps in the upper part of the channel and the two traps in the lower part of the channel in opposite directions and offset by 90°, the overall pump and the corresponding fluid movement was achieved. Flow direction was easily and quickly reversed by changing the rotation direction of both top and bottom lobes. It should be appreciated that the pump 116 is adaptable to the other non-invasive actuation techniques.

Figure 16:
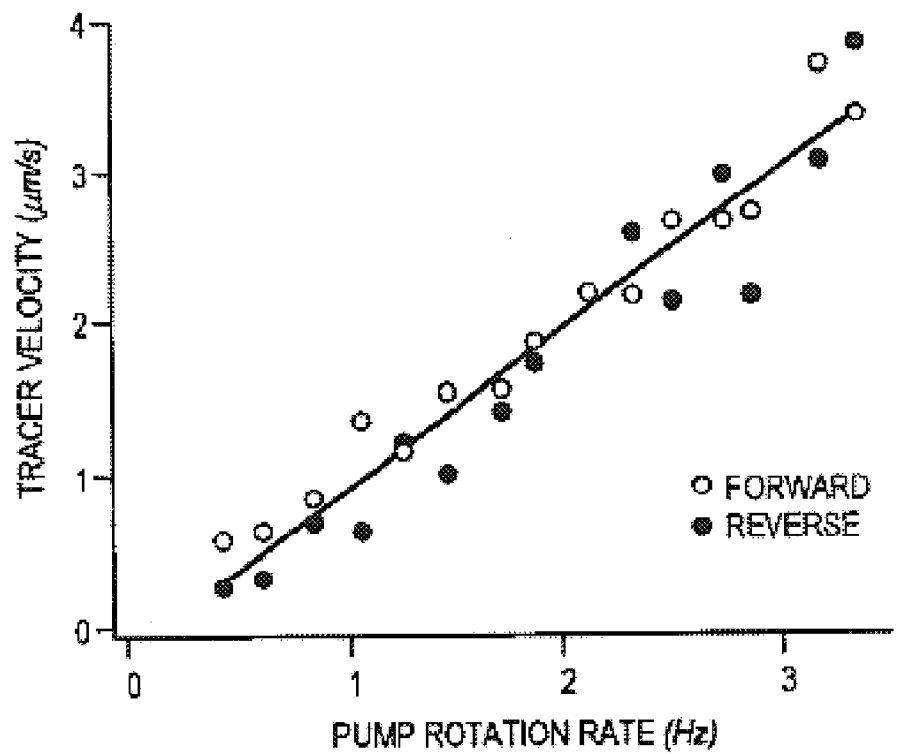
FIG. 16 is a graph showing the relationship of the velocity of a tracer particle in a microfluidic flow that is displaced by the pump shown in FIG. 14.

To aid visualization of flow and provide a means of estimating flow rate, tracer particles consisting of 1.5 μm silica spheres were added to the aqueous solution. Motion of these tracers could be easily visualized as seen in FIG. 15. The measured tracer particle velocities were determined as a function of the gear rotation rate both in the forward and reverse directions and indicate a maximum flow rate of 1 nl/hr. As shown in FIG. 16, the dependence appears to be linear and independent of direction as expected from the predicted laminar nature of the pumped flow.

Figure 17A:
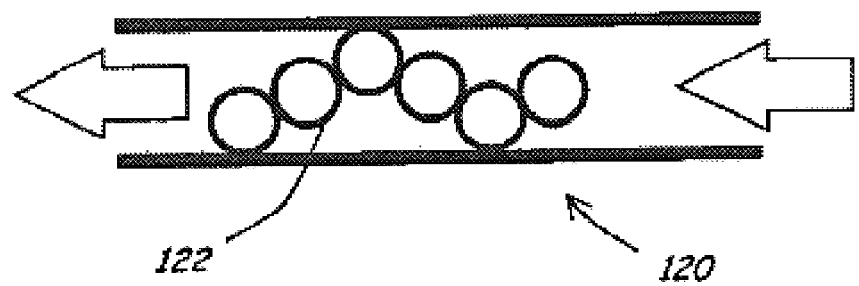
FIG. 17A illustrates a second embodiment of a microfluidic peristalsis pump that employs a string of colloidal particles that are manipulated using a non-invasive actuation technique so as to move the particles in a sinusoidal manner.

The gear pump design illustrates the success of positive displacement pumping through the use of colloidal microspheres; however, its design may prove particularly harsh to certain solutions. Though able to pump individual cells using the gear pump, concentrated cellular suspensions may be damaged by the aggressive motion of the meshing "gears" of the pump. With reference to FIG. 17A, a second pump 120 that reduces the possibility of such damage incorporates a peristaltic design that is also based upon the concept of positive fluid displacement, effectively a pseudo two-dimensional analog of a three-dimensional, macroscopic screw pump. If instead of rotating the particles as in the gear pump, a string of colloidal particles 122 is translated back and forth across the channel in a cooperative manner, fluid propagation can be achieved.

Figure 17B:
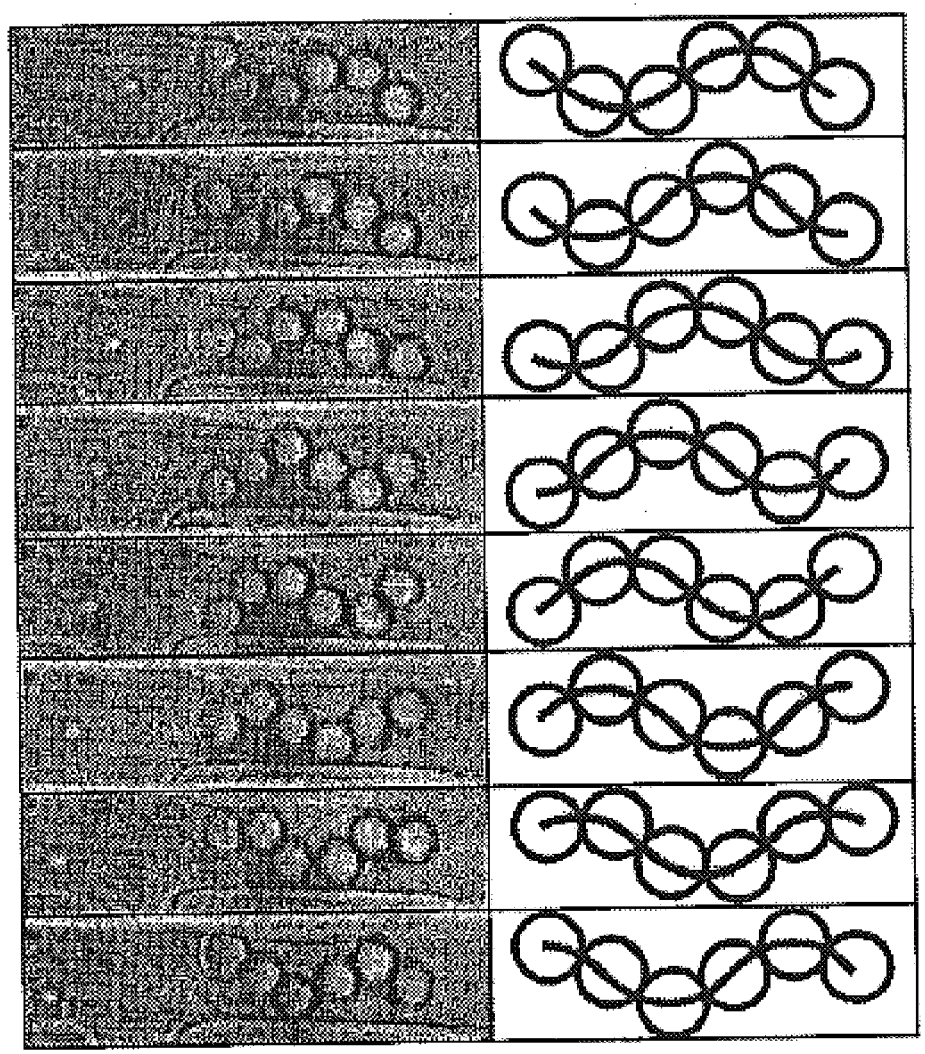
FIG. 17B incrementally illustrates a complete cycle of the colloidal pump structure shown in FIG. 17A.

The colloidal movement required to direct flow with this approach is illustrated in FIG. 17B. The optical trap moves the colloids 122 in a propagating sine wave within which a plug of fluid is encased. Direction of the flow can be reversed by changing the direction of colloidal wave movement. Once again, these experiments were performed with independent, 3 $\mu$m silica spheres; however, more colloids were used in the experiments of FIG. 17B to represent a complete wavelength. Fabrication of these pumps required first maneuvering the colloids into the channel section. Once in place, the optical trap was scanned such that multiple independent traps were created, one for each colloid compromising the peristaltic pump. As seen in FIG. 17B, tracer particles were also used in these experiments and indicate that comparable flow rates could be achieved with this approach. The pump 120 is adaptable to the other non-invasive actuation techniques previously noted.

The physical, colloid-based in situ positive displacement pumping scheme of these two pumps has a number of advantages in addition to its diminutive size. Because colloidal particles are used, depending on design the actuation scheme could be electrophoretic, magnetophoretic or optical-based. This range of actuation schemes will allow complex suspensions and non-polar organic solvents, two fluid classes in which electrophoretic pumping techniques falter or fail, to be pumped. Although both pumping approaches presented here are able to transport fluids and suspended particulates in a bulk fashion, neither is capable of directly manipulating particles or cells in solution. To create valves capable of both restricting and directing flow of cells or colloids within microfluidic networks, laser-initiated photopolymerization is employed to first lock colloids into specific geometries. Once polymerized, these structures are positioned and, in some cases, actuated by the same laser used for their construction.

Figure 42:
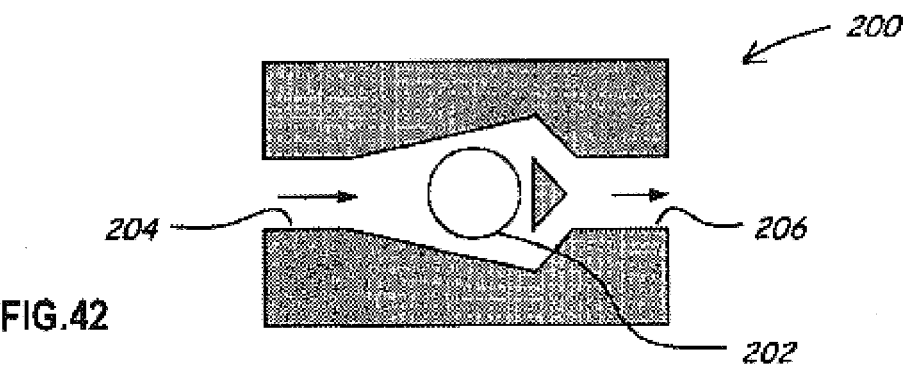
FIG. 42 illustrates another embodiment of a check valve.

With reference to FIGS. 18(1–12), the exemplary check valve 124 demonstrated here are comprised of a 3 $\mu$m silica sphere that serves as a hub 126 photopolymerized to several 0.64 $\mu$m silica spheres forming a linear structure. For passive application, the device was maneuvered into a straight channel and the 3 $\mu$m sphere held next to the wall allowing the arm to rotate freely in the microchannel. As the flow direction was changed, the valve selectively restricted the flow of large particles in one direction while allowing passage of all particles in the other. FIG. 42 illustrates another embodiment of a check valve 200 in which a colloidal particle 202 allows a fluid to flow from an inlet port 204 and an outlet port 206 but prevents fluid from flowing in the opposite direction by blocking the inlet port 204. With reference to FIGS. 19(1–12), to actively direct particulates to one of two exit channels, the passive valve 124 was maneuvered into a confining T geometry. As the valve structure was rotated about its swivel point using the optical trap, the top or bottom channel was sealed, directing flow of particulates toward the open channel (FIG. 4B).

As disclosed herein, colloidal particles can be used to fabricate true micron-scale microfluidic pumps and valves significantly smaller than current approaches. By using colloids in all of these designs and in microchannels of similar construction and length scale, the opportunity for extremely high-density device integration is available; thousands of 10 $\mu$m devices could be incorporated into a 1 mm$^2$ area. Although the use of an optical trap provides a number of advantages, including the elimination of physical connection to macroscopic hardware and the ability to instantly alter device design or location in situ, actuation of these devices via other applied fields is certainly feasible. As discussed previously, appropriately selected colloids will also translate in applied electric and magnetic fields. Because of its versatility, a colloid-based approach to microfluidic flow generation and control may indeed prove a powerful technique for the creation of complex, highly integrated, micro total analysis systems.

The present invention utilizes the ability of reversibly ordering colloidal particles in confined geometries to realize photonic devices. More specifically, the spatial periodicity of colloidal particles is readily varied to create optically active and switchable colloidal devices for photonics applications. In one approach, an applied electric field is used to create a strong lateral dipole-dipole interaction that induces colloidal crystallization in confining two-dimensional geometries. Because particle density is relatively low and the interaction of long range, colloidal mobility is high enough to allow rapid crystallization upon application of an electric field. These phase transitions are fully reversible and can be readily controlled by adjusting either the applied field strength or particle confinement. This approach is reversible, optically active, and requires reduced dimensionality for operation.

Control of Colloidal Morphology

Overview

It has been known for some time that colloids can undergo thermodynamically driven transitions to form ordered crystalline structures. Because of the length scales associated with the particle size and spacing in these systems, such colloidal crystals can diffract light in the optical regime. A number of researchers have attempted to take advantage of colloidal crystallization and ordering for the creation of optically active devices. These devices include materials that behave as optical filters as well as colloidal-crystal based sensors. A good review of different investigations focused on ordering colloidal systems as well as the specific colloids available for such efforts has been written by Xia, et.al.

In general most of the efforts at creating three-dimensional arrays rely either on the use of gravity to allow colloids to slowly settle and form dense ordered phases or the use of strong charge-induced colloidal repulsions to induce colloidal crystallization. Once created, these fragile structures are locked in by matrix polymerization and used directly or as a template for the creation of ordered structures made of different materials (higher index of refraction for example). Both the use of gravity and the use of electrostatic repulsions have significant drawbacks however. Gravity induced ordering requires highly monodisperse colloids and careful control of the density mismatch if reasonably-sized low-defect structures are to be obtained. Electrostatic repulsion induced ordering can require long periods of time and very careful control of the colloidal interactions. Manipulation of the colloidal surface for other purposes (sensor applications for example) influences these interactions leading to the extremely difficult problem of uncoupling one from the other.

Ordering with Electromagnetic Fields

Much of the work has focused on the manipulation of colloidal order and structure through the use of applied light intensity gradients, specifically, optical trapping. When a laser beam is focused to a diffraction-limited spot using a high numerical-aperture objective, micron-sized objects in solution are attracted and three dimensionally trapped into the region of highest light intensity. In 1970, Ashkin discussed and demonstrated the feasibility of this technique, called optical or laser tweezers. Since then, optical tweezers have been improved and applied to several fields, including chemistry, biology, colloidal and polymer science. In this technique, a single laser beam is focused through an objective at an object, which because of an index of refraction mismatch, redirects the focused beam. This redirection induces a change in light momentum, a change that must be balanced by the object. The net effect of this phenomenon is the holding of small micron-sized objects in the brightest part of a laser beam's focus. This revolutionary tool has received much interest mainly because it allows non-contact, non-intrusive and precise manipulation of objects in solution on the microscopic scale.

The remote and sterile nature of optical tweezers is particularly appealing for biological studies. Because infrared trapping beams are not strongly absorbed by biological tissue and cause low optical damage, they are used for manipulation of viruses and bacteria, studies of the properties of the cytoplasm, organelles, biological membranes, DNA and kinesin molecules, measurement of flagella compliance, and isolation of bacteria from complex microbial communities. For a review on biological applications of optical tweezers see Svoboda, K. & Block, S. M. Biological Applications of Optical Forces. Annu. Rev. Biophys. Biomol. Struct. 23, 247–285 (1994). Optical forces (in particular ultraviolet laser beams) have also been used as microscissors and micro-scalpels where the highly focused beam is used to cut and dissect particles or cellular components. Applications of optical tweezers, however, are not limited to biology. Because laser tweezer forces are in the range of a few hundred piconewtons, they can be used to measure the elastic properties of polymers, colloidal dynamics and colloidal interactions, such as depletion and electrostatic forces. Recently, optical tweezers have also been used to stick particles one by one to a polymeric substrate and as a novel type of scanning probe microscope where the soft spring of the optical trap is used to image samples in solution.

Recent developments have focused on the creation of simultaneous multiple optical traps. Multiple traps permit asymmetric objects to be spatially oriented, or the manipulation of two or more objects or two parts of the same object simultaneously in order to measure forces, dynamics or mechanical properties. This can be accomplished in several ways: by using photomasks, beamsplitters, refractive optics, or commercially available diffractive pattern generators to split the incident beam into simultaneous multiple tweezers, by creating interference between two or more incident laser beams, or by rapidly scanning a single laser beam among a number of positions with galvanomirrors or piezoelectrics to create a time-averaged trapping pattern.

Because this last approach is the most flexible and requires only a single laser beam, it has been applied to build a scanning laser optical trap (SLOT) to simultaneously manipulate multiple colloids into any designed pattern as shown in FIGS. 21A–D. In this approach, particles diffuse away when the laser is turned off, reassuming their equilibrium distribution. Examples of trapping multiple particles simultaneously are shown in FIGS. 21A–D. The time-sharing approach uses a piezoelectric mirror to deflect the beam at high rate ($10^3$ Hz). To trap multiple particles simultaneously with a single scanning laser beam, the repetition rate of the moving beam must be faster than time scales associated with particle Brownian diffusion, leading to scan rates on the order of 100 Hz for micron-size particles, while significantly higher scan rates are required for smaller particles. In addition, and as shown in FIGS. 22A–B, these structures are locked in place through polymerization approaches.

SLOT has been used to create ordered arrays of colloids with light and shown that this is a useful route to the creation of novel material. This approach, however, relies on an available source of focused light. Such sources are not readily available in many situations and other methods to order colloids would be useful for a variety of applications. For this reason, an approach has been developed that uses electric fields in confined geometries.

Ordering with Electric Fields

Recently, two-dimensional systems have been of particular interest because novel phase behavior and unique optical properties have been observed. Also, new interactions in confined geometries have been reported; as first discussed by Richetti et al. in 1984, electric fields induce a "lateral attraction" on electrode surfaces that can be used to create local colloidal crystallites. One can adjust the strength of this lateral attraction and the resulting phase behavior by changing the current magnitude. With this approach successful deposition of layer-by-layer colloidal crystals has been accomplished. This effect is illustrated schematically in FIGS. 23A–C where colloidal particles form tight two-dimensional crystals in the presence of a strong 3.1 V/µ ac field. Based on a simple model of aligned dipoles, however, one would expect these colloids to repel one another quite strongly. Trau et al., Yeh et al. and Böhmer have proposed that the lateral attraction results from electrohydrodynamic effects arising from charge accumulation near the electrodes due to the passage of ionic current. This hypothesis suggests that lateral variations in concentration polarization induce a spatially varying free charge that induces electroosmotic fluid motion in the presence of an electric field, causing the particles to move together.

Figure 26A:
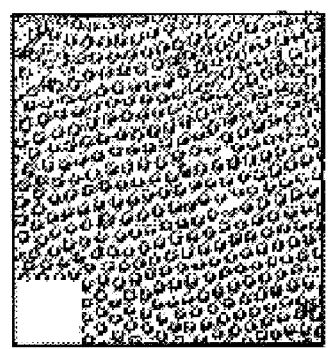
FIGS. 26A–26D illustrate the different phases of colloidal crystallization in a strictly confining structure as the applied electrical field is decreased.
Figure 26B:
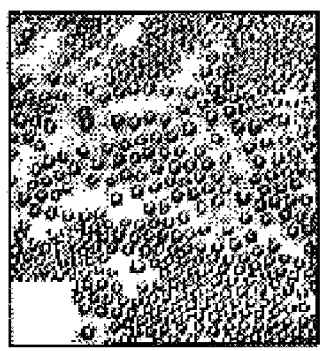
Figure 26C:
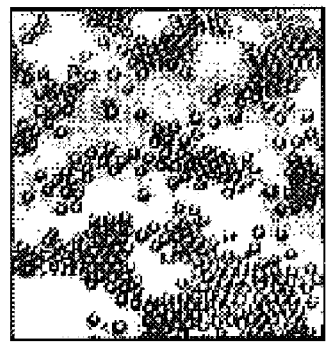
Figure 26D:
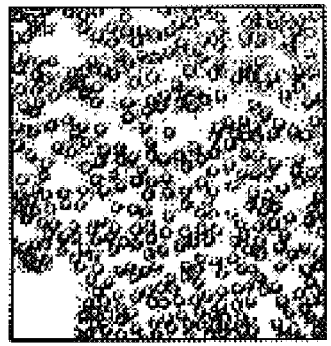

However, in strictly confined systems, drastically different behavior is observed in the presence of an electric field. Instead of strong lateral attractions, the colloids experience a strong lateral repulsion as illustrated in FIG. 24B and shown in FIG. 26A, where ordering has occurred within the strictly confining two-dimensional plane. This result is attributed to a change in the nature of the electroosmotically-induced fluid flow due to the imposed geometric constraints that either significantly diminishes or completely removes the effective attraction (FIG. 24B).

The strong lateral repulsion can be described in terms of a dipole-dipole interaction induced by the applied electric field. The strength of this interaction can be expressed as $$\phi(r,\theta) = -\frac{u^2}{4\pi\varepsilon\varepsilon_0 r^3}(2\cos^2\theta - \sin^2\theta) \quad (4)$$

for aligned point dipoles, where $\phi(r,\theta)$ is the interaction energy, u is the induced dipole moment, $\varepsilon$ and $\varepsilon_0$ are the dielectric permittivity of the medium and free space, respectively, r is the separation distance and $\theta$ is the angle between the field and dipole center line. The strength of the dipole can be related to the electric field strength E via u=αE, where α is the electric polarizability of the colloid. This equation illustrates that the interaction is most repulsive when colloids are in the same plane (θ=90°).

To illustrate the influence of geometry on the effective colloid interaction in the presence of an electric field, cells have been constructed with a wedge geometry which provides a linear spatial variation from strictly two to three dimensions. In this cell, the wedge angle is very small, ~0.1°, and the voltage applied is of constant peak-to-peak magnitude, leading to an applied field varying from 3.1 V/μ to 1.6 V/μ as one moves from the two to three dimensional cell regions. FIGS. 25A–D shows a series of images captured as the stage was translated from regions of 7μ to 3.5μ thickness. As the field varies linearly during this translation, the nature of the interaction clearly changes dramatically. In regions where the plate separation allows colloids to move slightly in the third dimension, the colloidal particles experience an effective attraction and form tight colloidal crystals. As one moves to strictly-confined two-dimensional regions, however, the gradual transition from interparticle attractions to repulsions can clearly be seen. In fact, one observes a full range of phase behavior, from attraction-induced colloidal crystallization to a two-phase system to entropy-driven repulsive colloidal ordering. This fully reversible behavior is clearly demonstrated as the dispersions revert to disordered fluids when the electric field is turned off.

If instead of using a wedge geometry, one strictly confines a relatively concentrated suspension to two dimensions, then the colloidal ordering can be controlled solely by varying electric field strength. FIGS. 26A–D illustrates this transition from ordered solid to fluid-solid coexistence to fluid as the field strength is lowered from 3.1 V/μ to 0.3 V/μ. This approach provides a convenient means of investigating phase transitions in two dimensions as one can easily tune the interactions and move throughout the phase diagram.

If the interaction is dominated by dipole-dipole interactions induced by the electric field, then particle size will play a large role in determining the field strengths required for colloidal ordering. This is due to the proportionality of the electric polarizability α to particle volume via $$\alpha = 4\pi\varepsilon_0 a^3 \left(\frac{n^2 - 1}{n^2 + 2}\right) \quad (5)$$

where α is the particle radius and n, the index of refraction ratio. Initially, begin by defining an effective area fraction $$\eta_{eff} = \eta * (r_{eff}/a)^2$$

where h is the colloid area fraction and $r_{eff}$ is an effective radius that grows with dipole-dipole interaction strength. If $r_{eff}$ is based on a particular $\phi_{eff}$ interaction energy then $$\frac{r_{eff}}{a} = \left[\frac{4\pi\varepsilon_0 a^3 E^2}{\varepsilon\phi_{eff}}\left(\frac{n^2-1}{n^2+2}\right)\right]^{1/3} \quad (6)$$

and $$\eta_{eff} = \eta a^2 E^{4/3} \left[\frac{4\pi\varepsilon_0}{\varepsilon\phi_{eff}}\left(\frac{n^2-1}{n^2+2}\right)\right]^{2/3} \quad (7)$$

Figure 27:
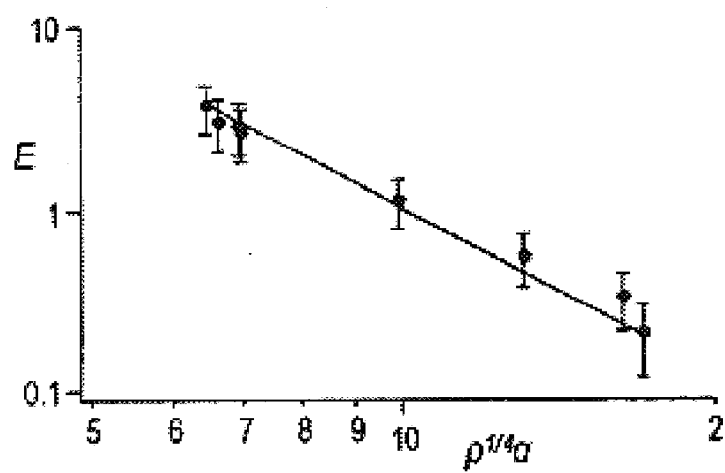
FIG. 27 is a graph that illustrates the variation of electrical field strength required to induce ordering with colloid size and density.
Figure 28A:
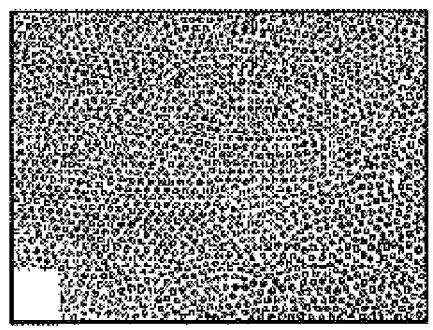
FIGS. 28A–28D illustrate the decay in colloidal ordering in a dense, strictly confined system as the applied electric field is decreased.
Figure 28B:
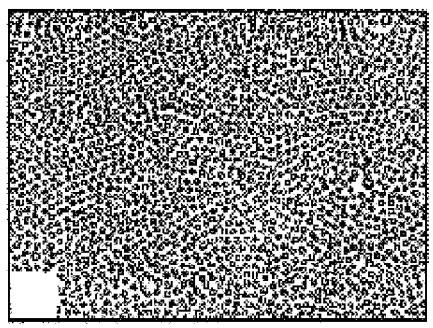
Figure 28C:
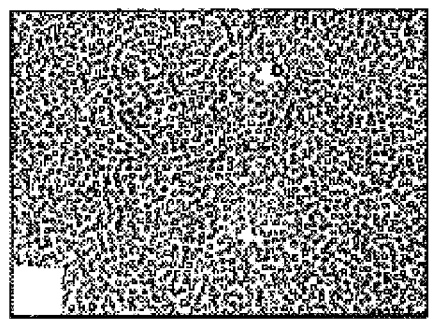
Figure 28D:
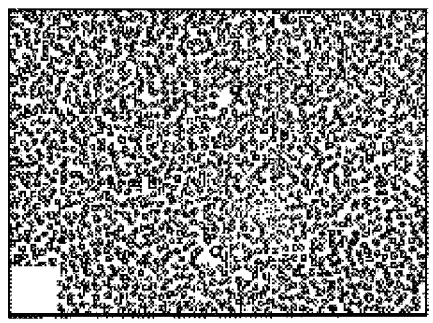
Figure 29A:
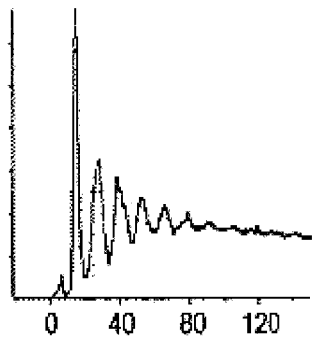
FIGS. 29A–29D illustrate the radial distribution functional for the images in FIGS. 28A–28D.
Figure 29B:
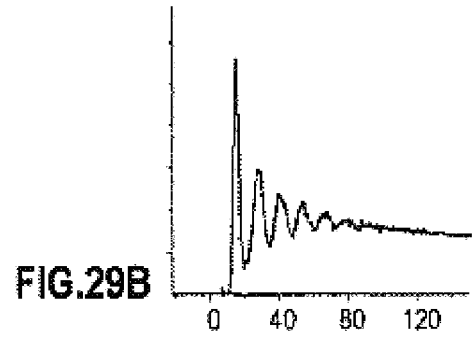
Figure 29C:
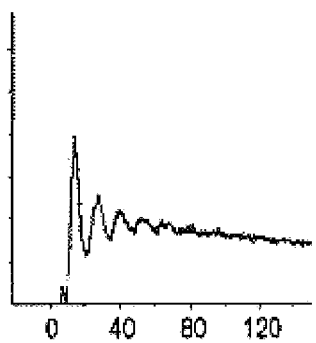
Figure 29D:
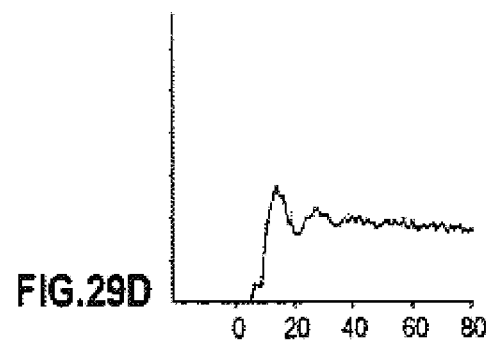

If one then assumes that there is a specific $\eta_{eff}$ at which the disorder-order transition occurs, then the electric field required for ordering, E, is proportional to $(\eta\alpha^2)^{-3/4}$ or $(\rho^{1/4}\alpha)^{-3}$ where ρ is the number density. Despite the simplicity of this approach, the behavior observed experimentally is indeed consistent with this scaling analysis; as the particle size increased, the electric fields required to induce order decreased significantly. FIG. 27 shows the field strengths required to induce order for systems of different particle size and density. The behavior follows the expected power law dependence indicating that the dipole-dipole interaction is indeed dominating the observed phase behavior. FIGS. 28A–D show that the ordering can also be done in relatively dense systems as verified by the radial distribution functions generated in FIGS. 29A–D.

Previous studies have shown that electric fields can be used to induce order in such colloidal systems. These studies, however, used an experimental configuration that limits practical application. Specifically, and as illustrated in FIG. 31A, these previous experiments placed glass coverslips (of thickness ~150μ) on either side of the sample and between the electrodes used to apply the fields. Because of this, an extremely high voltage of 800V was required to apply a field of approximately 0.2 V/μ in the colloidal fluid. As illustrated in FIG. 31B, another approach changes the position of the intervening cover slips and places the electrodes in contact with the colloidal fluid, which provides the following advantages:

1) Significantly higher electric fields are achievable within the fluid by applying much lower, practical voltages. Ten times the electric field is obtained by applying only 5V across the electrodes (less than 1/100th of other studies). As shown in Equation 4, the colloidal interaction strength is proportional to the electric field squared, $\phi(r,\theta)\sim u^2\sim E^2$; therefore, ten times the applied field corresponds to 100 times the interaction strength; and 2) Because the interaction strengths are much greater, ordering occurs rapidly, seconds for micron-sized colloids as opposed to approximately an hour in previous investigations.

3) Attractive-type ordering, as shown in FIGS. 23A–C and FIG. 25A, requires the electrodes to be in contact with the fluid. This approach allows one to vary the effective colloidal interaction from purely repulsive to one that has an apparent attractive component.

This approach to ordering colloidal systems can be used as a route to the controlled assembly of macroscopic colloidal phases in confined geometries. Small-angle light scattering, where a laser beam is passed through the sample perpendicular to the plane of colloidal order, can be used to emphasize this. Initially, rings associated with a disordered colloidal fluid can be readily observed as seen in FIGS. 30A–C where the sample consisted of 3μ colloidal polystyrene particles dispersed in water within a strictly confining two-dimensional geometry. Upon application of the electric field, both powder-type diffraction patterns (indicating the presence of crystals of varying orientation) and single crystal patterns (as shown in FIGS. 30A–C and indicating colloidal single crystals of size ~1 mm) were quickly seen.

These experiments illustrate both that electric field induced repulsive dipole-dipole interactions can be used to cause ordering of colloidal particles in confined geometries and that these ordered systems are optically active. Because these forces are strong and long-ranged, they can dominate other colloidal interaction and be used to induce colloidal order where crystallization otherwise would not occur. In addition, colloidal mobility remains relatively high after crystallization, allowing the rapid formation of large ordered domains. The invention takes advantage of the ease and speed with which these colloidal systems can be reversibly ordered to manipulate the propagation of light in these low-dimensional systems. Such electrically switchable colloidal arrays could find use in a variety of photonic applications, including optical switches, waveguides, and band gap materials.

Colloid-Based Photonic Devices

The application of fields for the control of colloidal order is used to manipulate light and create switchable photonic devices. As discussed above, the application of electric fields across a confined colloidal solution induces an interparticle repulsion strong enough to quickly form ordered two-dimensional crystals. This effect has been shown in FIGS. 20A–C, FIGS. 26A–D, and FIGS. 28A–D. These examples illustrate that strong lateral repulsions are significant only in low-dimensional systems and can be described in terms of a dipole-dipole interaction induced by the applied electric field.

Two different applications will be discussed here. First, the creation of two-dimensional photonic band gap colloidal arrays for light propagation control will be presented. Here, the fact that particular frequencies of light can be forbidden by Maxwell's equations in certain geometries allows the direction of light away from those regions. Using this idea, the focus is on the creation of a switchable waveguide and related devices for light redirection. The second approach relies on similar sample geometries; however, it is based on the different but related concept that ordered arrays can diffract light (as shown experimentally in FIGS. 30A–C). This combined with the ability to reversibly turn the Bragg condition on and off will form the basis of the optical switching technology.

Photonic Band Gaps

As discussed by Joannopoulos, a photonic band gap defines a range of frequencies for which light is forbidden. By preparing systems with well-defined defects within such a crystal, the propagation of forbidden frequencies can be well controlled as illustrated in FIGS. 32A–C. The behavior of a lattice depends both on the spatial periodicity and the dielectic properties of the crystal components. With the use of colloidal systems, both of these factors are tunable by changing the system and/or the medium solvents, or by adjusting the spatial periodicity by varying the concentration or the applied field strength.

FIGS. 32A–C illustrates the use of a colloidal bandgap material for the steering of light. In this, a two-dimensional cell 150 viewed from above is fabricated such that the colloid cannot penetrate regions 152A, B where light is intended to propagate. If the colloid is randomly dispersed, the light will not turn through the sharp angle and will be scattered. Upon application of an electric field, however, the colloids order, satisfying the bandgap condition and forcing the light to travel down the channel 152A or 152B. Straightforward extensions of this idea lead to the ability to switch the direction of light propagation. Also, the effect is reversible; upon removal of the electric field light will not pass through the device. Though, in principle, design of such a device is quite simple, fabrication of a working model based on particulate systems requires careful choice of colloid and matrix materials such that the bandgap condition is satisfied. It should also be appreciated that light is directed into the regions 152A or 152B by a mirror, lens, waveguide or other light directing component.

For calculating the band structures and electromagnetic modes for a given lattice and dielectric contrast, a program developed by the Joannopoulos research group at MIT is used. The software is called "MIT Photonic-Bands (MPB)" (website: http://jdj.mit.edu/mpb/, freeware, including downloads, manuals, and tutorials).

For different colloidal systems, one begins by specifying the lattice geometry, the number of eigenvectors to compute, the dielectric constants for both medium and the particles, and what to output (for certain applications, band frequencies for both TM mode and TE modes). As discussed previously, larger index of refraction differences tend to give rise to larger band gaps. To test this, a system of titania in air is used and the results are shown in FIGS. 34A–B and FIGS. 35A–B. The dielectric constants for titanium dioxide and air are 8.4 and 1 respectively. For each value of r/a (where r is the particle radius and a is the spacing), the band structure for both TM and TE modes is shown. From these figures, it can be seen that, at r/a=0.225, multiple gaps are present in TM and TE modes. In fact, for this particular system, there is a small band gap overlap, giving rise to a complete (but narrow) bandgap at reduced frequencies between 0.866 to 0.877 as shown in FIG. 36.

This is used to determine the design of a prototype colloidal system for control of wavelengths in the telecommunication regime (1.55 μm). The mid complete gap frequency is 0.872; therefore $$\frac{\omega a}{2\pi c} = \frac{a}{\lambda} = \frac{r}{0.225\lambda} = 0.872 \qquad (8)$$

leading to a particle radius of approximately 300 nm and an area fraction (concentration) of 18.4%. If, instead, there is interest in manipulating visible wavelengths using the same system, the absolute magnitudes of a and r now change. Assuming a wavelength of 500 nm, a particle radius of 98 nm will be required at the same area fraction.

Defect Structures

Once a two-dimensional photonic crystal of any lattice structure is created, the propagation of light is controlled through the introduction of designed defects. This can be accomplished through a number of different means:

Method A: Physical Exclusion

In this approach, the cell confining the colloidal dispersion is designed in such a way that colloids are forbidden to propagate through the waveguiding regions. One approach to accomplishing this is to make forbidden regions thinner than the colloid diameter. See FIGS. 41A–B for example.

Method B: Selective Optical Trapping

As previously discussed, light can be used to manipulate colloidal particle distribution. It is feasible to both order with electric fields and manipulate colloid location simultaneously with the application of a laser optical trap. This ability allows the creation of single spot or line defects rapidly and reversibly, effectively creating and destroying waveguides or other defect structures at will and in any region.

Method C: Selective Application of Electric Fields

In a fashion similar to that of Method B, electric fields may be used to create selective defects. If different field strengths are present in different cell regions, colloids will seek (depending on their dielectric constant relative to the fluid in which they are dispersed), and order in, those regions of lower energy. The advantage here is that such varied fields can be applied rapidly and in any manner allowing the creation and destruction of controlled defects at will and in any configuration.

Lattice Structures

Though the example here is focused on the use of monodisperse colloids to form triangular lattice structures, other related structures can form band gaps either more readily or over a broader range of conditions.

Method A: Triangular Lattice

Figure 33:
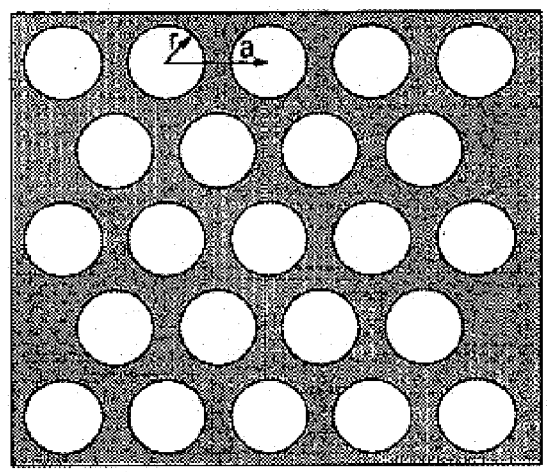
FIG. 33 illustrates the triangular lattice colloidal structure shown in FIGS. 26 and 28.
Figure 34A:
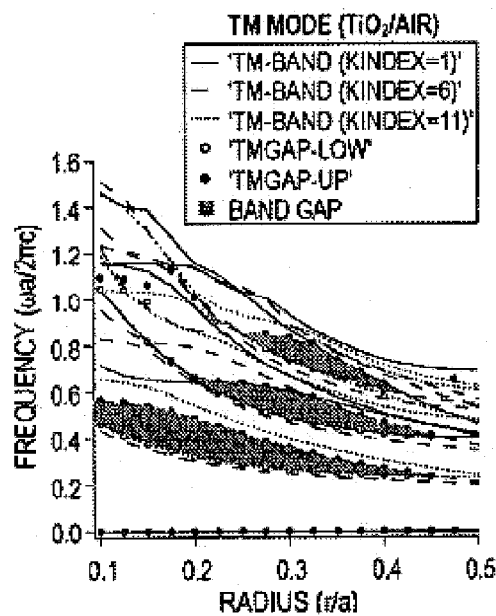
FIGS. 34A–34B respectively illustrate the TM and TE gaps for the triangular lattice of $TiO_2$ in air as r/a is varied.
Figure 34B:
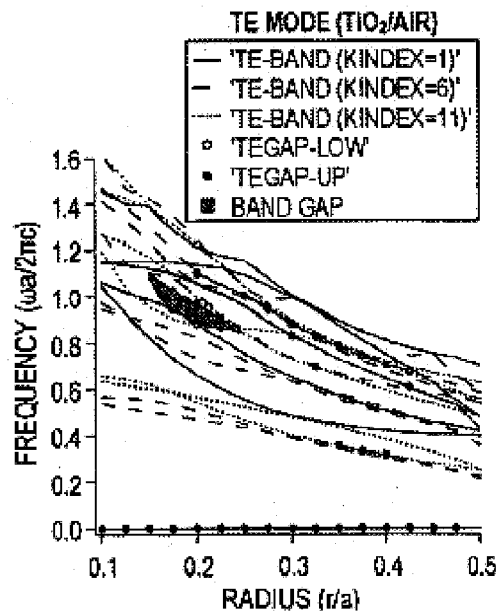

This lattice is illustrated in FIG. 33 and shown in the experiments of FIGS. 26A–D and FIGS. 28A–D. Though it may not be the ideal lattice for all applications, it is readily formed and has been shown to exhibit bandgaps for systems with significant index of refraction differences.

Method B: Other Lattice Structures

In addition to the triangular (or hexagonal) lattice, systems with other lattice structures have been shown to have significant band gaps. One example is the honeycomb lattice discussed by Joannopoulos and shown in FIGS. 37A–C. In some configurations, isotropic colloids and applied electric fields have been used to reversibly create similar structures.

Particles

Though the calculations shown here have been done for homogeneous, spherical particles, some authors have proposed the use of inhomogeneous particles. Specific examples include the use of spheres connected by rods, mixtures of big and little spheres, and spheres with varying magnetic permeability.

Method A: Spherical Particles

Used in the calculations presented here, spherical particles have been shown to produce a bandgap in systems with large index of refraction differences.

Method B: Nonspherical/Inhomogeneous Particles

Some theoretical studies discussed above have shown that nonspherical or inhomogeneous particles may provide for significant photonic bandgaps. The noted technique for the manipulation of colloidal particles can also be used on such particles.

Optical Filtering/Switching

The general idea of these studies is to take advantage of the ability of these ordered systems to diffract light as already shown in FIGS. 30A–C. Because the ability to tune both the size of the individual colloid as well as its concentration exists (and associated lattice spacing upon application of the electric field), the Bragg condition can be manipulated in a reversible manner. Other studies have shown that arrays of colloids can be used as band rejection filters, non-linear photonic crystals, thermo-optical switches, and diffractive composites. In addition, when placed between crossed polarizers and illuminated with white light, ordered colloidal arrays have been observed to diffract according to their orientation relative to the incident light. The resulting bright colors observed can be well described by dynamical diffraction theory.

One issue that must be resolved for such switching applications is the time scales involved for the disorder-order transition. It has been observed that ordering for 3 micron polystyrene requires a couple of seconds. As much smaller particles and narrower cells are used, one would expect that the ordering will proceed more rapidly because particles will not have as far to diffuse and Stokes drag is proportional to the particle size ($\bar{F}=6\pi\mu a \bar{v}$). Balancing this, however is the fact that particle polarizability is proportional to its volume squared leading to a weaker repulsion for smaller particles. A simple scaling analysis taking these factors into account plus knowledge that required ordering fields scale as $E \sim (\eta \alpha^2)^{-3/4}$, leads to the result that the time required for ordering should scale as $\alpha^3$ for constant particle concentrations. Therefore switching times on the order of milliseconds are anticipated for submicron particles with the noted approach.

One example application where such switching times are sufficient and the 100 nm or so length scale is appropriate would be in the use of electric field induced colloidal ordering for a simple display technology. The ability to change the Bragg condition by varying particle size and concentration within the confining cells is used. Combined with white light these could be used to selectively diffract specific wavelengths, resulting in specific regions of particular color. Such an approach is quite similar to the colloidal crystal scattering and characterization seen in for static systems. Stacked layers between crossed polarizers can be used as a means of creating different colors or changing intensity (grayscale). One of the main advantages of such an approach is that expensive liquid crystalline materials would not be required, only inexpensive colloidal materials such as titanium dioxide, which is used in paint.

FIGS. 38A–C illustrates three approaches.

Method A: Transmission Geometry with Polarized Light

An optical switch 160 is shown in FIG. 38A. The switch 160 comprises a cell 162 that strictly constrains colloidal particles to two dimensional motion and has a structure for applying an electrical field with a component that extends perpendicular to plane within which the colloidal particles are constrained. Examples of such cells are shown in FIG. 24B and FIG. 3A. The switch further comprises first and second polarizers 162A, B, which are crossed (i.e., at 90°) to one another. While the first and second polarizers 162A, B are shown as being on the outside of the cell 160, they could be located elsewhere, provided the colloidal particles are located between the polarizers. A structure facilitates the entry of light into the switch 160 by directing light (e.g., lens, mirror, waveguide or other light directing element) and/or situating the switch 160 so that light engages the switch 160 at an angle to the plane of the switch (e.g., 90°). Typically, the light is white light. This method places the crystal between crossed polarizing filters illuminated with white light. Upon application of the electrical field, the colloidal particles enter an ordered state and depolarization of the light occurs, such as that described by dynamical diffraction theory, and specific wavelengths are allowed to pass through the switch or analyzer. This configuration would appear black to the observer in the "off" state, i.e., when the electrical field is no longer applied to the switch, resulting in the colloidal particles entering an unordered state.

Method B: Transmission Geometry with Unpolarized Light. Those who have seen a colloidal crystal (or an opal) illuminated by white light know that polarized light is not a requirement for diffraction of different colors. To illustrate this, Method B and Method C in FIGS. 38A–C rely on diffraction of unpolarized light. Here, no polarizer is used and the observer is instead situated only to observe diffracted light produced by a diffraction cell. A diffraction cell 170 is shown in FIG. 38B. Examples of suitable diffraction cells are also shown in FIGS. 3A and 24B. A structure facilitates the entry of light into the diffractor 170 by directing light (e.g., lens, mirror, waveguide or other light directing element) and/or situating the diffractor 170 so that light engages the diffractor 170 at an angle to the plane of the diffractor 170 (e.g., 90°) Typically, the light is white light. When the electrical field is produced across the diffractor 170, the colloidal particles enter an ordered state and the white light entering the colloidal space is diffracted. When the electrical field is removed, the white light passes through the diffractor 170. Switching small crystals of different Bragg condition spaced close to one another can be used as a means of blending light to make different colors. These configurations would appear white to the observer in the "off" state.

Method C: Reflection Geometry. Possibly taking advantage of available ambient light, a reflection geometry can also be used and is most analogous to diffraction of white light by an opal. A reflection cell 180 is shown in FIG. 38C. Examples of suitable reflection cells are also shown in FIGS. 3A and 24B. A structure facilitates engagement of the light with the reflection cell 180 by directing light (e.g., lens, mirror, waveguide, etc.) and/or situating the cell 180 so that the cell 180 receives light at an angle to the cell that is suitable for reflection. When the electrical field is produced across the cell 180, the colloidal particles enter an ordered state that reflects light that is at at least one frequency. When the electrical field is removed, the colloidal particles enter an unordered state that prevents reflection.

Cell Fabrication Techniques

Fabrication of the devices is achieved with techniques that allow the preparation of two-dimensional cells narrow enough to allow the confinement of small colloidal particles. In particular, a combination of traditional silicon processing techniques, nanofilm deposition and novel soft lithography methods is employed to fabricate custom nanoelectrical confinement cells that serve as the basis of waveguides and optical switches. These cells, while conceptually simple, are functionally elegant and can be fabricated very rapidly, allowing for designs to be created and tested with great efficiency.

Figure 39A:
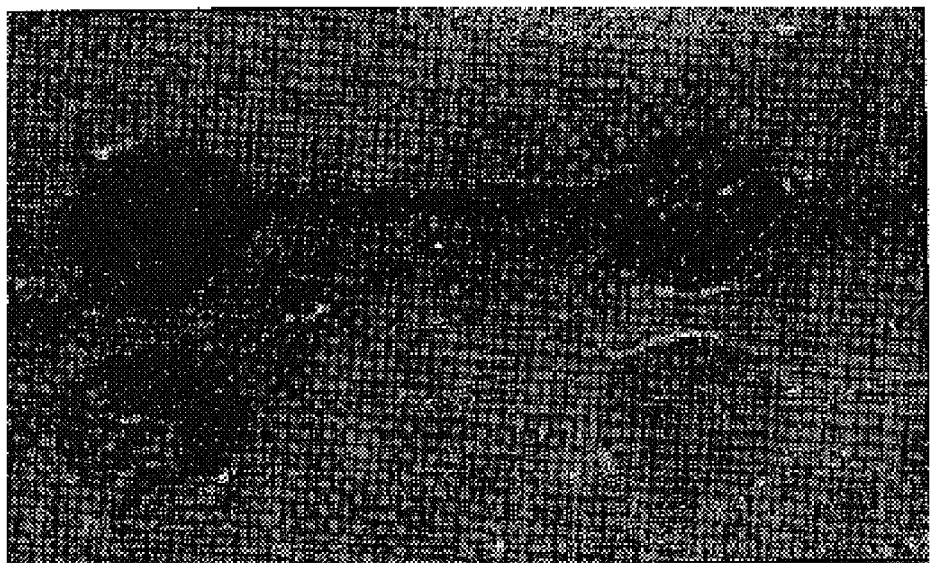
FIGS. 39A–39B respectively illustrate a photoresist on a silicon master and a PDMS replica constructed using rapid prototyping.
Figure 39B:
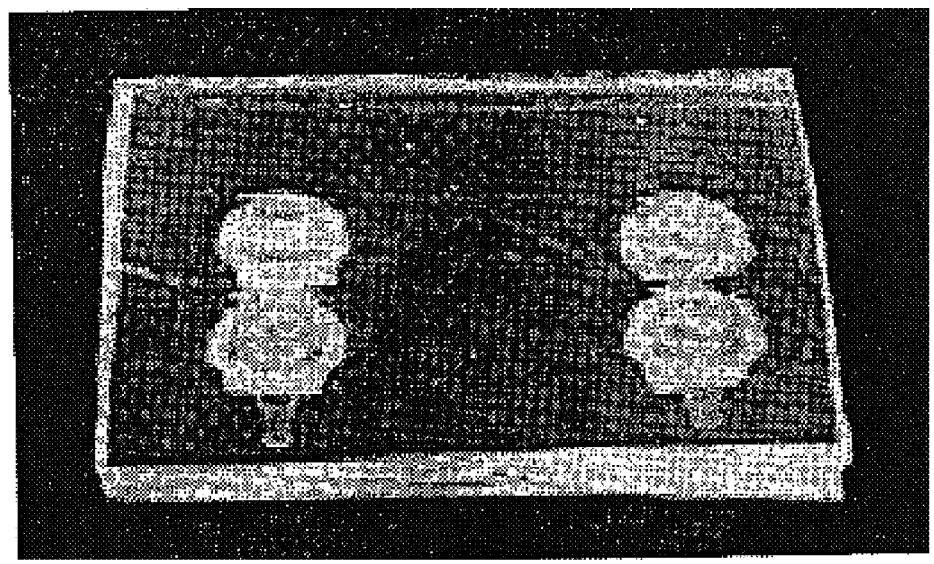
Figure 40A:
FIGS. 40A–40C respectively illustrate a bottom slide of a confinement cell in an embodiment of a photonic waveguide; a top slide for the cell with a patterned waveguide and a PDMS fluid control network, and an assembled cell.
Figure 40B:
Figure 40C:

Currently, microfluidic systems are assembled using a methodology coined "rapid prototyping". Using standard photolithography techniques, a pattern is produced on silicon or silicon dioxide substrates in thick SU-8 photoresist. Following the photolithography step, the pattern is then used directly as a "master" to produce positive relief replicas in polydimethylsiloxane (PDMS), an optically transparent elastomer. FIG. 39 is a simple microfluidic device created by the rapid prototyping process for the purpose of examining the adhesion and growth of biofilms in aqueous environments under varying flow conditions. Features of any depth from tens of nanometers to hundreds of microns may be created by this process and channel widths are constrained only by the limitations of photolithography, which now stand at less than a single micron. Precise engineering of microfluidic networks easily allow for extreme control over femtoliter quantities of fluid, and will be employed to interface with and deliver nanoparticle suspensions to the photonic switching cells and optical devices. The details of the rapid prototyping process that is employed are discussed below.

Photolithography

Templates of microchannels ($\mu$Chs) and microfluidic networks ($\mu$FNs) are created lithographically with ultraviolet (UV) light by transposing the pattern of a shadow mask to a UV sensitive negative photoresist. The patterns are subsequently developed in an appropriate solution, leaving only the negative relief of the desired pattern, which may be used directly as a PDMS master or etched to produce a permanent master. If used directly to create PDMS replicas, photoresist films may be prepared with thickness from 25 nm to 250$\mu$, thus providing a wide range of accessible sizes and aspect ratios. Except for situations in which extremely thin films are required, a SU-8 series negative photoresist (MicroChem Corp., Newton, Mass.) is employed, which is capable of producing rugged patterns with high aspect ratios that can be directly cast into PDMS replicas and reused many times.

Reactive Ion Etching (RIE)

Reactive ion etching (RIE), commonly referred to as glow discharge or plasma etching, is employed to create permanent masters in silicon wafers. RIE is favored over wet etching techniques for many applications because it provides $\mu$Chs of variable and quite high aspect ratios with relatively straight walls and rapid etch rates. Due to the isotropic nature of wet etching with hydrofluoric acid (HF), the maximum possible aspect ratio (channel depth divided by width) is 0.5. RIE is typically used only to create permanent masters as it considerably compounds the overall fabrication time.

Soft Lithography

PDMS replicas are created using a commercially available two-component kit (Sylgard 184 Kit, Dow Coming). A mixture of elastomer and curing agent are poured over the silicon master and cured under vacuum to degas the elastomer solution. PDMS makes an ideal candidate for $\mu$FN production because it can be cured quite rapidly, patterns are faithfully reproduced, even on the nanoscale and the process can be conducted in a non-clean room environment. Furthermore, the design and fabrication of $\mu$FNs becomes increasingly flexible as masters may be fabricated with increasingly complex designs.

Cured PDMS replicas are peeled from the master, leaving a clean, reusable template. The replica is finally placed in conformal contact with either a glass slide or PDMS flat forming a tight, reversible seal and enclosing channels capable of conveying fluids. PDMS is natively hydrophobic, but can be easily modified to create a hydrophilic surface through brief exposure to an oxygen plasma. Replica films as thin as 1$\mu$ may also be created by spin coating PDMS onto a silicon master. Such films may be patterned to be used as soft components such as micro gaskets, seals and spacers for multilevel functional devices. Thicker films (>40$\mu$) may be removed from the substrate and used as shadow masks for the deposition of metal features, such as electrodes, onto other replicas or a wet etching mask for the patterning of conducting tin oxides (CTOs). Also recently developed is a microfluidic network concept that is capable of accessing the z-dimension through the stacking of multiple thin PDMS films. While PDMS films cannot be fabricated thinly enough to be used as the active region in the photonic switching devices, its optical transparency and excellent sealing properties facilitate its application as a simple and convenient means of fluidic introduction and control.

Plasma Enhanced Chemical Vapor Deposition (PECVD)

The necessity of applying an electric field perpendicular to the two dimensional plane in which the colloidal nanoparticles reside requires that both faces of the confining cell be conductive. This stipulation is yet another reason why PDMS may not be used as the active region in the photonic switches and devices. Therefore, indium tin oxide (ITO) coated microscope slides and cover slips separated by a thin polymer layer deposited by PECVD and patterned by liftoff are used. PECVD is a slight modification of RIE and is, in fact performed in the same piece of equipment. By lowering the fluorine-to-carbon ratio in the etch gas while adding hydrogen, one may cross the boundary which divides the etching and polymerization regimes. This tuning of the etch gas composition allows for fluoropolymer films to be rapidly deposited on substrates as opposed to the etching of that substrate. This technique is used to deposit films of readily controllable thickness greater than 10 nm.

These PECVD grown films may also be patterned by one of two methods. The first technique, liftoff, is applicable for polymer films less than 1 $\mu$m (the maximum thickness for the positive photoreisist). Typically used for the patterning of metals deposited by evaporation, liftoff is performed by first patterning positive photoresist on the substrate surface and then performing deposition. In the case of PECVD, a uniform polymer film will be grown upon the substrate surface as well as the predeposited and patterned photoresist. After deposition is completed, the substrate is immersed in an appropriate solvent for the photoresist, such as acetone, which strips or "lifts off" both the photoresist and its polymer coating, leaving only the film on the originally exposed portion of the substrate. A second, similar method for patterning PECVD grown films uses PDMS as the "mask" instead of photoresist, and can therefore be used for films of any thickness. This method requires that a PDMS mask be prepared by soft lithography and placed upon the substrate before deposition. After the polymer film has been grown, the PDMS mask is simply peeled off, leaving a film of the desired pattern.

Cell Assembly

Once PECVD grown polymer film spacers have been patterned onto an ITO coated slide, the cell is completed by placing another slide on top and applying pressure with two small clips. This method, while simple, provides a tight seal and renders the cells reusable. Finally, a PDMS microfluidic network coupled to both a nanoparticle suspension containing syringe pump and a nitrogen supply is placed in conformal contact at the edge of the juncture between the two slides to control the introduction of fluid to the cell.

Figure 41A:
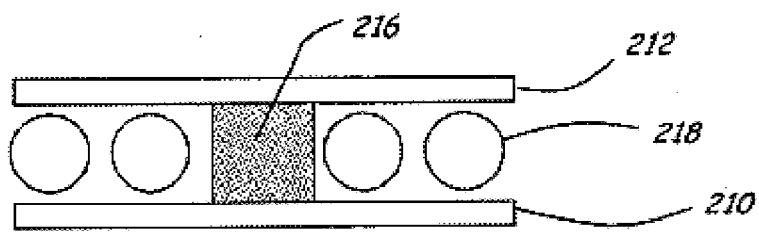
FIGS. 41A–41B are cross-sectional views of a photonic waveguide of the type show in FIG. 40C, a wall respectfully extends from the top slide to the bottom slide and extends from the top slide towards the bottom slide.
Figure 41B:
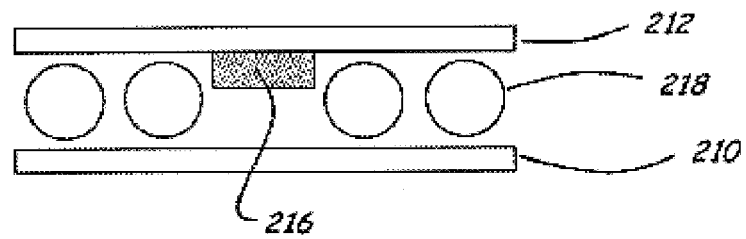

The fabrication method described above will allow for the rapid assembly of confinement cells with nanoscale separations that are required for the large scale repulsive, reversible ordering of nanoparticles. To fashion these two-dimensional crystalline arrays into functional waveguiding or optical switching devices, specific defects must be introduced to the crystal structure. This requirement will be easily met with the range of existing processing techniques. Specifically, PECVD and liftoff are employed to deposit and pattern polymer features, this time upon the top slide of the cell. By tuning the thickness of the features on the top slide of the cell to be one half to one third the thickness of the spacer film on the lower slide, regions are created where particles are excluded, yet light may still propagate through the suspension medium, be it air or some solvent. This approach would require the coupling of optic fiber into the cell via a focusing device, such as a near-field scanning optical microscopy (NSOM) tip. An alternate approach, which is preferred for rudimentary studies, uses a patterned polymer or photoresist film as both the waveguide (via total internal reflection (TIR)) as well as the particle exclusion barrier. For angles greater than those required for TIR, the bandgap created by the ordered particles at the interface would bend the light through the waveguide. This cell configuration is also shown in FIGS. 40A–C and FIGS. 41A–B and is complementary to the colloidal behavior predicted in FIGS. 32A–C. The exemplary cell includes a bottom slide 210 with a spacer 212, a top slide 214 with a patterned waveguide or blocking element 216 and a fluid control network 218. With reference to FIG. 41A, the waveguide 216 extends from the bottom slide 210 to the top slide 212. In FIG. 41B, the waveguide 216 extends from the top slide 212 towards the bottom slide 210. In either case, the waveguide prevents colloidal particles from entering a space between the slides through which light will propagate when the cell is in use. As previously noted, the cell is capable of being adapted so that electrical fields, magnetic fields and electromagnetic fields can be applied to place the colloids in an ordered state.

What is claimed is:

1. A microfluidic structure comprising:
    a structure defining an input structure for receiving a microfluidic stream, an output structure for transmitting a microfluidic stream, and a space between said input structure and said output structure;
    a colloidal structure located in said space between said input structure and said output structure; and
    means for applying a field to said colloidal structure to manipulate said colloidal structure so as to be able to control the flow of a microfluidic stream between said input structure and said output structure; wherein:
    said colloidal structure comprises a first colloidal particle that is fixedly located at a first location within said space and not directly between said input structure and said output structure, a second colloidal particle that is fixedly located at a second location within said space and not directly between said input structure and said output structure; and a third colloidal particle that is movable between an unblocking location that allows a microfluidic stream to flow between said input structure and said output structure and a blocking location that prevents a microfluidic stream from flowing between said input structure and said output structure.

2. A microfluidic structure, as claimed in claim 1, wherein:
    said means for applying a field comprises a first pair of electrodes for use in producing an electrical field across said first colloidal particle that repels said third colloidal particle and a second pair of electrodes for use in producing an electrical field across said second colloidal particle that repels said third colloidal particle.

3. A microfluidic structure, as claimed in claim 1, wherein:
    said structure includes a limit structure for preventing said third colloidal particle from contacting at least one of said first and second colloidal particles.

4. A microfluidic structure, as claimed in claim 1, wherein: said input structure comprises only one input port.

5. A microfluidic structure, as claimed in claim 4, wherein: said output structure comprises only one output port.

6. A microfluidic structure, as claimed in claim 4, wherein: said output structure comprises more than one output port.

7. A microfluidic structure, as claimed in claim 1, wherein: said input structure comprises more than one input port.

8. A microfluidic structure, as claimed in claim 7, wherein: said output structure comprises only one output port.

9. A microfluidic structure, as claimed in claim 7, wherein: said output structure comprises more than one output port.

10. A microfluidic structure comprising:
    a structure defining an input structure for receiving a microfluidic stream, an output structure for transmitting a microfluidic stream, and a space between said input structure and said output structure;
    a colloidal structure located in said space between said input structure and said output structure; and
    means for applying a field to said colloidal structure to manipulate said colloidal structure so as to be able to control the flow of a microfluidic stream between said input structure and said output structure;
    wherein: said colloidal structure includes a charged colloidal particle;
    wherein: said means for applying a field comprises a first electrode and a second electrode for use in moving said charged colloidal particle between an unblocking location that allows a microfluidic flow between said input structure and said output structure and a blocking location that prevents a microfluidic flow between said input structure and said output structure by electrophoresis.

11. A microfluidic structure, as claimed in claim 10, wherein: said input structure comprises one of the following: only one input port and multiple input ports.

12. A microfluidic structure, as claimed in claim 11, wherein:
said output structure comprises one of the following: only one output port and multiple output ports.

13. A microfluidic structure comprising:
a structure defining an input structure for receiving a microfluidic stream, an output structure for transmitting a microfluidic stream, and a space between said input structure and said output structure;
a colloidal structure located in said space between said input structure and said output structure; and
means for applying a field to said colloidal structure to manipulate said colloidal structure so as to be able to control the flow of a microfluidic stream between said input structure and said output structure; wherein: said colloidal structure includes a colloidal particle in which a magnetic dipole will be induced by the application of a magnetic field;
wherein: said means for applying a field comprises means for applying a magnetic field to move said colloidal particle between an unblocking location that allows a microfluidic flow between said input structure and said output structure and a blocking location that prevents a microfluidic flow between said input structure and said output structure by electrophoresis.

14. A microfluidic structure, as claimed in claim 13, wherein:
said input structure comprises one of the following: only one input port and multiple input ports.

15. A microfluidic structure, as claimed in claim 14, wherein:
said output structure comprises one of the following: only one output port and multiple output ports.

16. A microfluidic structure comprising:
a structure defining an input structure for receiving a microfluidic stream, an output structure for transmitting a microfluidic stream, and a space between said input structure and said output structure;
a colloidal structure located in said space between said input structure and said output structure; and
means for applying a field to said colloidal structure to manipulate said colloidal structure so as to be able to control the flow of a microfluidic stream between said input structure and said output structure; wherein: said colloidal structure includes a colloidal particle in which a magnetic dipole will be induced by the application of a magnetic field;
wherein: said means for applying a field comprises means for producing an optical trap to move a colloidal particle between an unblocking location that allows a microfluidic flow between said input structure and said output structure and a blocking location that prevents a microfluidic flow between said input structure and said output structure by electrophoresis.

17. A microfluidic structure, as claimed in claim 16, wherein: said input structure comprises one of the following: only one input port and multiple input ports.

18. A microfluidic structure, as claimed in claim 17 wherein: said output structure comprises one of the following: only one output port and multiple output ports.

* * * * *

UNITED STATES PATENT AND TRADEMARK OFFICE
CERTIFICATE OF CORRECTION

PATENT NO. : 6,802,489 B2
DATED : October 12, 2004
INVENTOR(S) : Marr et al.

It is certified that error appears in the above-identified patent and that said Letters Patent is hereby corrected as shown below:

Column 3,
Line 1, delete "Microsystems", and insert -- microsystems --;

Column 9,
Line 33, delete "Microsystems", and insert -- microsystems --;

Column 14,
Line 7, delete " $Re = \frac{\vec{\rho v D}}{\pi} = \frac{4\rho Q}{\pi D \mu}$ ", and insert -- $Re = \frac{\vec{\rho v D}}{\mu} = \frac{4\rho Q}{\pi D \mu}$ --;

Column 27,
Line 56, delete " $(\vec{F} = 6\pi\mu a \vec{v})$ ", and insert -- $(\vec{F} = 6\pi\mu a \vec{v})$ --;

Line 61, delete "$E \sim (\eta\alpha^2)^{-3/4}$", and insert -- $E \sim (\eta a^2)^{-3/4}$ --;
Line 62, delete "$\alpha^3$", and insert -- $a^3$ --; and Column 30,
Line 11, delete "Coming", and insert -- Corning --.

Signed and Sealed this

Twenty-ninth Day of March, 2005

JON W. DUDAS
*Director of the United States Patent and Trademark Office*